(12) United States Patent  
Kraft

(10) Patent No.: US 6,341,008 B1
(45) Date of Patent: *Jan. 22, 2002

(54) PHOTOGRAPHIC COPIER

(75) Inventor: Walter Kraft, Zürich (CH)

(73) Assignee: Gretag Imaging AG (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,438

(22) Filed: Aug. 20, 1999

(30) Foreign Application Priority Data

Aug. 20, 1998 (EP) .............................................. 98115693

(51) Int. Cl.[7] ........................ G03B 27/54; G03B 27/72; G02F 1/1345
(52) U.S. Cl. .......................... 355/67; 355/71; 349/149; 349/152
(58) Field of Search .............................. 355/35, 67, 71; 349/1, 2, 5, 10, 56, 57, 61, 62, 84–86, 88, 89, 93, 104, 35, 49, 143, 147, 152, 149

(56) References Cited

U.S. PATENT DOCUMENTS

| | | | | |
|---|---|---|---|---|
| 3,462,650 A | * | 8/1969 | Hennings et al. ............ | 257/524 |
| 4,239,385 A | * | 12/1980 | Hujer ............................ | 355/71 |
| 4,603,945 A | * | 8/1986 | Fergason ....................... | 349/86 |
| 5,343,071 A | * | 8/1994 | Kazior et al. ................ | 257/621 |
| 5,369,466 A | * | 11/1994 | Jenny ............................ | 355/67 |
| 5,528,080 A | * | 6/1996 | Goldstein ..................... | 257/741 |
| 5,539,547 A | * | 7/1996 | Ishii et al. ..................... | 349/86 |
| 5,558,813 A | * | 9/1996 | Akashi et al. ........... | 252/299.01 |
| 5,850,281 A | * | 12/1998 | Benker ......................... | 355/71 |
| 5,953,103 A | * | 9/1999 | Nakamura ..................... | 355/32 |
| 5,978,066 A | * | 11/1999 | Treiber et al. ................ | 355/40 |
| 6,023,312 A | * | 2/2000 | Hasegawa et al. ............ | 349/88 |
| 6,172,733 B1 | * | 1/2001 | Hong et al. .................. | 349/152 |

* cited by examiner

*Primary Examiner*—Russell Adams
*Assistant Examiner*—R. Fuller
(74) *Attorney, Agent, or Firm*—Pennie & Edmonds LLP

(57) ABSTRACT

The present invention relates to a photographic copier apparatus for projecting a photographic original onto a light sensitive copy material. The photographic copier has the following: (a) a light source for emitting light for the projection, (b) a number of optical, light guiding elements for guiding the light along a light path from the light source to the copy material as well as for the projecting of the original onto the light sensitive copy material, and (c) a liquid crystal matrix through which the light is guided by way of the light guiding elements, before it exposes the copy material. According to the present invention, the liquid crystal matrix has a plurality of elements, the transmission of which can be individually changed. The change in transmission of each element of the liquid crystal matrix is achieved by scattering of the light passing through the element, whereby the degree of the scattering is controllable by application of a voltage.

26 Claims, 14 Drawing Sheets

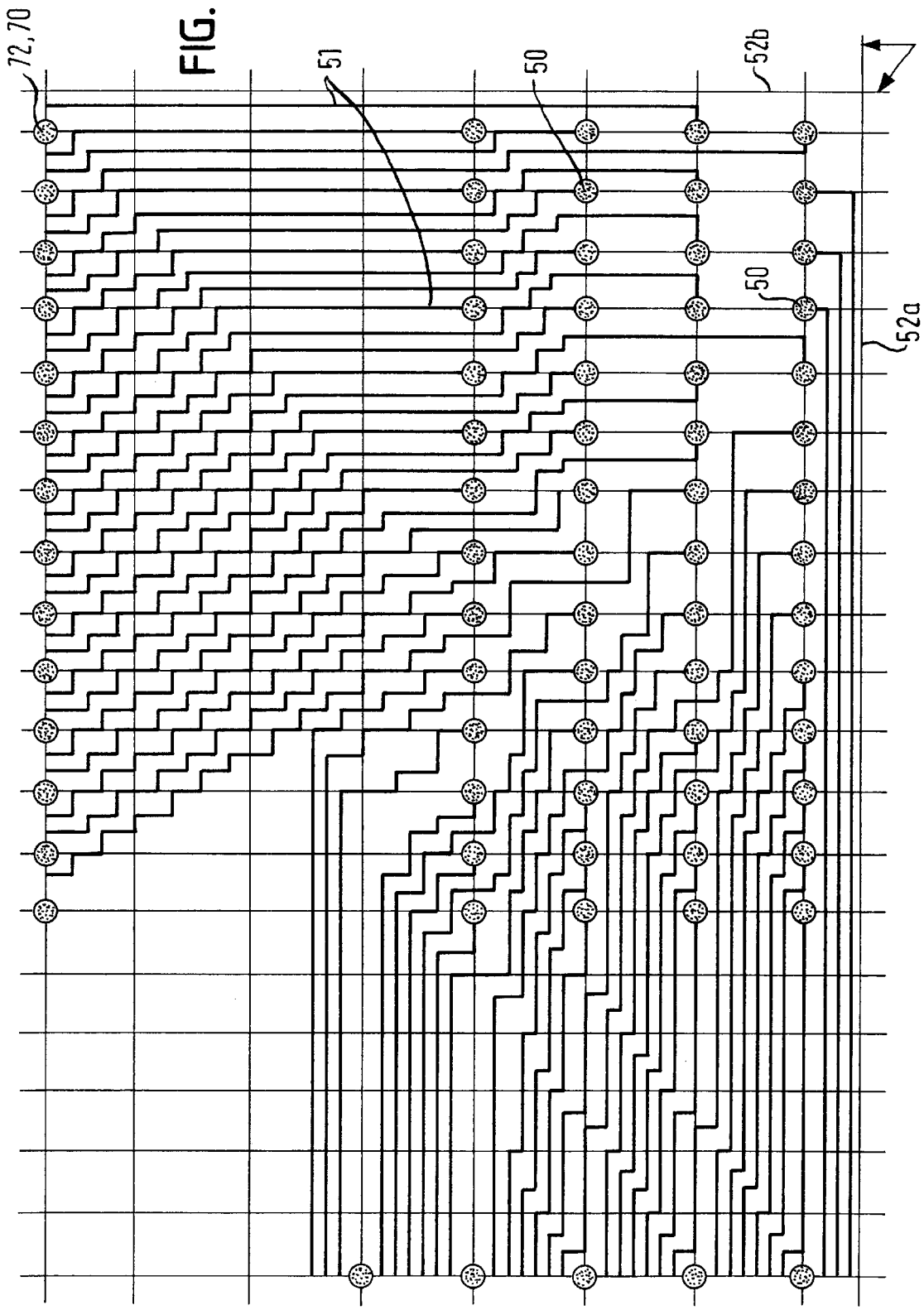

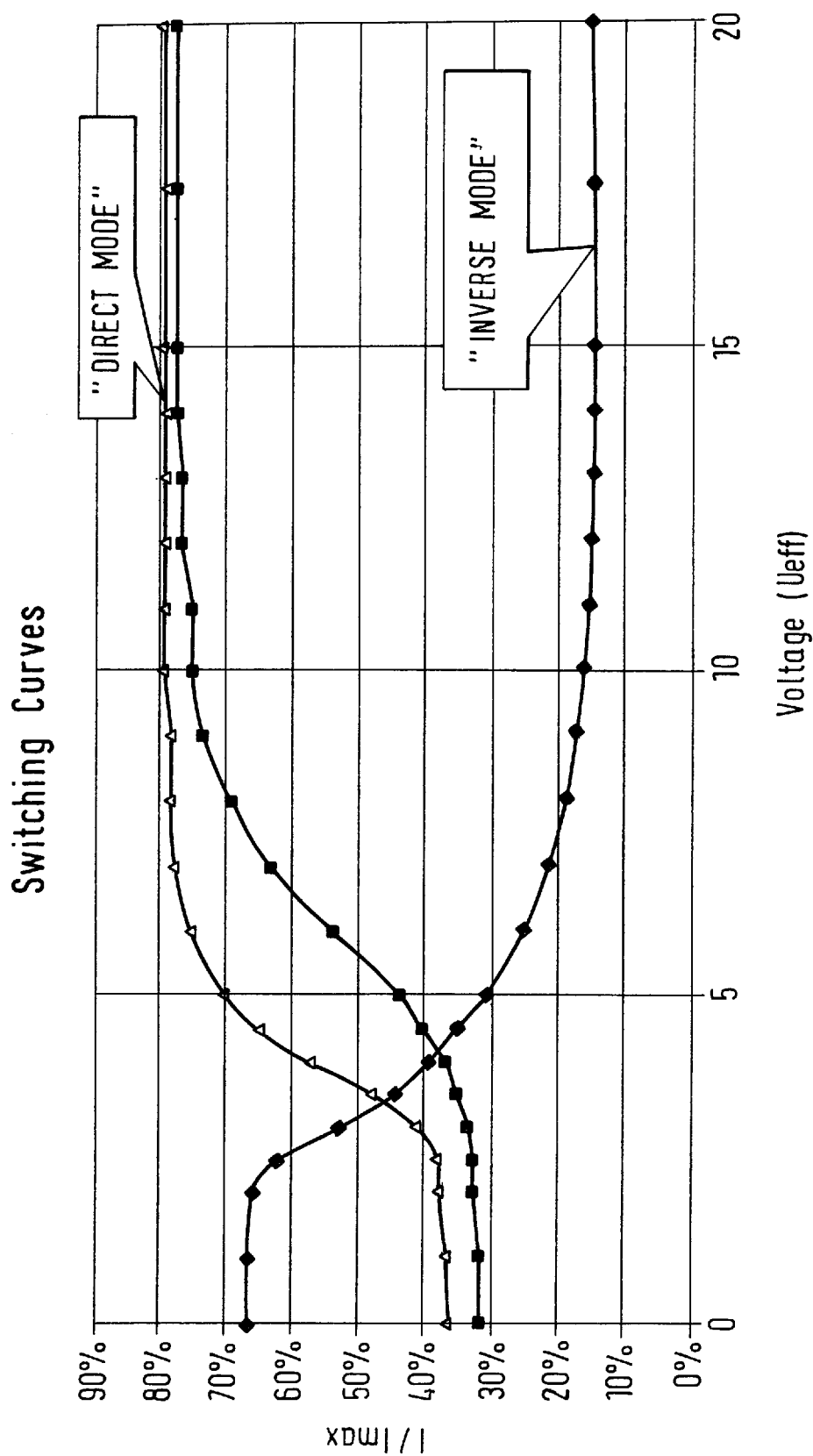

PHOTOGRAPHIC COPIER

FIELD OF THE INVENTION

The present invention relates to the field of photo finishing and, more precisely, a photographic copier which is also referred to as photographic printer or optical printer. Such a photographic copier serves the production of photographic prints in a photographic copier, films which, for example, were exposed in a photographic camera are projected onto photographic copier material (for example, photo paper).

BACKGROUND ART

The exposure of the copier material not always results in a satisfactory reproduction of the picture information captured on the film. An essential cause therefore is that the dynamic of the luminescence (Grayscaling) contained in the picture information to be depicted cannot be converted on the picture median. This is caused, for example, by the strongly reduced luminescence dynamic range of the photo paper compared to a photographic film. Furthermore, the sensitivities of the photo paper are dependent on the light used for the projection. All this must be taken into consideration for producing a photographic copy, for example, on photographic paper, in order to achieve a realistic reproduction on the photographic paper of the picture information captured with the film.

It is especially required for the achievement of a good copy quality that the brightness profile of the copy is manipulated. One reason herefore, for example, resides in that the brightness differences which are still recognizable by an observer of the original photographic picture information which forms the basis of the film (the original), are no longer recognizable for the observer of the photographic copy when these brightness differences are located in a dark or very bright region of the photographic copy.

In order overcome this disadvantage, photographic copiers or optical printers have been suggested which use a LCD matrix in the path of the exposure beam. The transparence of the individual elements of the LCD matrix and thus the intensity profile of the light incident on the photographic paper is controllable and the brightness profile can thereby be influenced.

Conventionally, LCD matrixes are used herefore which are also used in screens or displays. These LCD matrixes have a high number of elements and operate according to the polymerization principle. This means a polarization filter is switched in series before or after matrix and the polarization condition of the matrix can be changed by applying a voltage so that the polarizations condition is perpendicular or parallel to the polarization filter. A complete darkening by way of the matrix can be achieved therewith. Such a matrix is known from DE 28 20 965 and DE 40 40 498.

It is known from DE 43 08 864 to combine several closely adjacent elements to a group whereby one part of the element of the group are switched to bright and the other part of the group to dark. Depending on the ratio of the bright and dark elements, different Grayscales can be achieved.

The matrix described in DE 197 03 063 includes 1500 individually controllable Grayscale able points.

As already mentioned above, polarization effects are normally used for the LCD matrixes. A further example therefore is described in U.S. Pat. No. 3,926,520.

A disadvantage of the copier apparatus used in the conventional matrixes is the low degree of transmission of the matrixes. Because of the polarization filter alone, at least 50% of the light intensity are lost. In practice, the maximum transparency of the conventional LCD matrixes is less than 20%. This however means that the intensity of the illuminating means is used in the copier apparatus must be increased by at least a factor of 5 in order to compensate for the intensity loss because of the LCD matrix. The higher light power, however, causes a higher thermal load on the component of the copier apparatus and especially also the LCD matrix which absorbs a major portion of the light energy.

SUMMARY OF THE INVENTION

It is an object of the invention to provide a photographic copier apparatus, wherein the influencing of the brightness profile is possible by way of a matrix without the requirement that the intensity of the illuminating means must be significantly increased.

This object is achieved with the features of the independent claims. Preferred embodiments are apparent from the dependent claims.

The photographic copier apparatus according to the invention includes, of course, a light source which emits the light required for the exposure of the photographic original. Typically, lamps, such as halogen lamps, are used as light source. However, in accordance with the invention, laser diodes or light emitting diodes can also be used which further reduce the thermal load.

In accordance with the invention, light sources of different colour, for example, lamps, or light emitting diodes of different colour can be used which light can be additively superimposed.

For example, a blue, green and red lamp can be provided which are mixed, for example, by way of a system for the optical mixing of the green, blue and red light. An optical mixing system can consists, for example, of mirrors which are, transparent for two of the three colors and reflect the other one of the three colors. An example for such a mixing system is disclosed in DE 43 09 795 C2. When differently coloured light sources are used, the spectrum of the exposure light for exposure of the copier material can be changed and adapted to the respective situation by changing the intensity of the different light sources or changing the time during which the differently coloured light sources act on the copier material. The respective situation is influenced, for example, by the type of the original material or copier material used, or by the image information contained in the original. Based on data on the copier material, the original material and/or the image information contained in the film, the duration and/or intensity with which the light of a specific colour acts on the copier material can be controlled by way of a data processing arrangement in order to so achieve an optimal picture quality. Alternatively or in addition to the differently coloured light sources, colour filters can be provided as described further below. These colour filters can also be controlled on the basis of the above-mentioned data in order to so influence the spectrum of the light acting on the copier material with respect to duration and intensity of the individual colours.

The above mentioned coloured lamps, i.e. the blue, green and red lamp can be realized by way of a lamp which emits white light and which is combined with a colour filter which only lets red, green or blue light pass.

To guide the light from the light source to the photographic original, to shine it therethrough and to guide it to the light sensitive copier material, optical, light guiding, for example, light bundling or light scattering means, such as lenses, mirrors, shudders, partially transparent mirrors, compound lenses, collecting lenses, dispersing lenses, prisms and so on are provided.

In order to produce a desired brightness profile on the light-sensitive copier material, a liquid crystal matrix is provided in the light path which is shone through by the light before it impinges on the photographic copier material. The individual elements of the liquid crystal matrix may be controlled so that the transmission of the individual elements can be changed. A light intensity profile is thereby produced so that individual regions of the photographic copier material can be more strongly exposed than others. The brightness profile of the photographic copier material can thereby be manipulated in the desired manner in order to produce an optimal picture for the observer on the copier material.

The brightness profile is manipulated depending on the image information captured by the film. For example, regions which would become dark on the copier material without manipulation are brightened when thereby contrast or brightness scales become more clearly apparent in the dark region. In order to be able to use the captured image information for the manipulation of the brightness profile, it must be recorded and analysed prior to the control of the liquid crystal matrix, which preferably is a scattering liquid crystal matrix.

Conventionally, the recording of the image information for this purpose is carried out with a scanner which scans the photographic original (the film) before the latter is shown through for the production of a copy. Such a scanner is usually located in the photographic copier and is positioned along the transport path of the original material.

A separate scanner is usually provided for the production of index prints.

Index prints represent a collection of the pictures of a photographic original on a printout or a photographic copier material. The individual images are significantly smaller than the usual picture formats and usually have a lower resolution. This separate scanner is preferably provided for APS films (Advanced Photo System). In accordance with the invention, the scanning data which were intended for the production of an index print are now used as the data bases for a manipulation of the brightness profile by way of the liquid crystal matrix. The liquid crystal matrix is thereby preferably scattering liquid crystal matrix, but it can also be a common, especially polarizing matrix. In this case of a common matrix as well, the external scanner is preferably used as herein described. In this manner, a scanning by the scanner provided within the photographic copier, which was intended for the gathering of the image information for the brightness manipulation, can be dispensed with. This speeds up the throughput in the photographic copier. Because of the external scanner which is indented for the production of the index prints, the internal scanner can also be disposed with and, thus, the copier cost reduced. Alternatively, the internal scanner can also be used, for example, for conventional small picture films (for example, 24 mm×36 mm format), while the external scanner is used for APS films.

Preferably, the data from the external scanner are processed before they are used for the control of the liquid crystal matrix. A data processing device is preferably provided therefore between the external scanner and the photographic copier which device is preferably also positioned outside the photographic copier. This data processing device converts the data from the external scanner into a format which corresponds to the format of the internal scanner. For example, the resolution of the external scanner per image is typically significantly higher than the resolution of the scanner in accordance with the invention. The liquid crystal matrix preferably has a resolution of less than 1000 elements. The resolution which is provided by the internal scanner corresponds exactly or substantially with the element number of the liquid crystal matrix. However, this resolution is usually significantly higher with an external scanner for the production of index prints of sufficient quality. For this reason, the data processing device converts the resolution of the external scanner in such a way that it is compatible with the element number of the liquid crystal matrix. Adjacent image elements captured by the external scanner are preferably combined therefore in order to obtain a smaller image data amount adapted to the element number for the control of the liquid crystal matrix. During this combination, the individual, combined image elements can be weighted differently.

Preferably, the data processing device is also used to supply a possibly externally positioned device for the printing of the index prints with the scanning data required therefore. These scanning data or image data preferably have a higher resolution as the image data used for the control of the liquid crystal matrix.

Especially when the number of lines and columns of the image data elements captured with the external scanner are not a multiple of the elements of the liquid crystal matrix used for the copier, an adaptation preferably by way of mathematical algorithms is carried out which provides a continuous transition of the image elements. For example, averaging processes or weighting processes are used. Mathematical processes can also be used, for example, for a desired reduction and sharpness of the image date before they are used for the control of the liquid crystal matrix.

It is therefore a preferred variant of the invention that the scanning is not carried out in a single step within the copier apparatus together with the transport of the original material in the copier, but in a separate step for the scanning of the original material before the latter is fed into the copier apparatus. It therefore concerns a two step process, first the external scanning of the original material and then the processing of the original material within the copier apparatus.

The individual elements of the liquid crystal matrix are preferably positioned in one plane. The elements of the liquid crystal matrix are in the following, also referred to as image elements.

Conventionally, liquid crystal matrixes are used in photographic copier apparatus which allow in the locked condition an almost complete darkening. This allows the production of different Grayscales by combination of several liquid crystal elements to one group as described, for example, in DE 43 08 864. It is thereby a disadvantage that this type of matrixes has a low maximum transmission.

The inventors of the present application have discovered that the liquid crystal matrixes operating according to the scattering principle are well suited for the manipulation of the brightness profile despite their relatively low ratio between maximum and minimum transmission (contrast), namely of typically three. Although with such scatter matrixes, one can typically achieve at a maximum transmission of 80% only a minimal transmission of about 30% or at a maximum transmission of about 70% a minimal transmission of about 10%, but the contrasts achievable thereby have proven sufficient. An essential advantage over the conventional LCD matrixes which typically use the polarization effect is the high maximum but the also comparatively high minimum transmission as well the scatter effect. All this prevents a heating up of the matrix. The high transmission signifies a low absorption and thereby little heating up. The absorption itself is reduced compared to the conventionally used liquid crystal matrixes, since the matrix essentially does not absorb the light but scatters it, contrary to the polarizing matrix.

The high maximum transmission is promoted by a comparatively low element number of the matrix. The inventors of the present application have discovered that an element number of typically less than 2000 and preferably in the range of about 200 to 1000 is sufficient to achieve an optically pleasing manipulation of the brightness profile. Because of the low element number, the percentage surface portion of the electrical conductors on a matrix for the individual elements can be reduced, whereby the transmission is further increased.

It is a disadvantage of a low element number that the intensity profile produced by the different transmission of the elements of the liquid crystal matrix can produce brightness edges on the copier material which irritate the observer. For this reason, in accordance with the invention, the liquid crystal matrix is preferably optically unfocused projected onto the photographic copier material so that a smoothing of the light intensity profile produced by the liquid crystal matrix results.

A control of the total brightness can be carried out through the exposure time by way of a shutter. However, because of the high light transparency of the scattering matrix, it can be advantageous to attenuate the total light intensity in order to so avoid extremely short or also highly fluctuating exposure times. For this purpose, gray filters can be moved into the light beam. Preferably, the duration is adjustable during which the gray filters are moved into the light beam during the exposure process. Exposure times of roughly equal length guarantee a steady transport of the copier material and the original material in the printer.

Because of the highly scattering effect of the scattering matrix, the latter is preferably housed in an absorbing environment in order to prevent that scatter light reflected by the side walls circuitously reaches the copier material. Alternatively or additionally, the matrix is embedded in a diaphragm or diaphragm device which prevents that light separated from the matrix reaches the copier material. The diaphragm device, for example, can include several, serially positioned lines. For this, the matrix is preferably housed in a housing or light duct with light entry and light exit openings. In this housing or light duct, further openings are preferably provided for the electrical conduits for the control of the matrix. The inner walls of the housing or light duct are preferably constructed so that they absorb the scattered light.

The scattering matrix is preferably positioned before the photographic original so that the photographic original is shown through with the light intensity profile. The matrix is, however, not positioned directly before the photographic original (film). In order to avoid a focussed projection of the intensitive profile onto the photographic copier material, but at a preselected distance. A scatter disk is preferably positioned between the photographic original and the matrix. The scatter disk is preferably positioned as close as possible to the scatter matrix. It is especially preferred to integrate the scatter disk at the exit side into the above-mentioned housing for receiving the scatter matrix. Integrator plates or so-called honeycomb lenses are preferably used as optical elements for the culmination of the light.

A comb filter is preferably provided for the adaptation of the light used for the exposure to the spectral sensitivity of the copier material. It lets light within several preselected spectral windows pass with a respectively preselected intensity. For a similar purpose, a so-called balance filter or compensation filter is provided in the light beam which changes the spectral intensity distribution of the light and adapts it to the spectral sensitivity of the copier material.

Furthermore, colour filters are preferably provided which can be selectively inserted into the light path for a preselected time. In this manner, an especial adaptation to different copier materials or originals can be carried out. For example, if the photographic original requires an especial amount of red light, an exposure with only red light can be carried out for a preselected time before or after the exposure of the copier material in that the red colour filter is moved into the light path.

In order to achieve a liquid crystal matrix with a high maximum transmission, a liquid crystal matrix is preferably used which has a first transparent plate and a second transparent plate which are planar and spaced apart parallel to one another. A liquid crystal fluid is inserted between the plates which cannot escape from the intermediate space between the plates. At least one of the plates includes electrodes which can be supplied with control signals through feed conductors. In such a LCD arrangement, the first plate on a first side includes an electrode associated with a picture element, whereby the signal feed conductor for the electrode is conductor for the electrode is provided on the side opposite the first side of the first plate and whereby the electrode is connected with its associated feed conductor through a conductive region in the first plate.

It is thereby possible according to the invention to make the active surface of the individual picture elements exceptionally large, since no space must be spared for conductors connecting the electrodes of the picture elements with the feed conductors of the LCD arrangement. In this manner, a space between the electrodes of the picture elements is only required to prevent cross talk or short circuiting between the electrodes or the picture elements. Otherwise, if the feed conductors, as common in the prior art, were positioned on the same side as the electrodes of the picture elements, first, sufficient space would have to be provided also for the various feed conductors on the same side of a transparent plate and, second, respectively sufficient spacing would have to be provided between the various feed conductors and the electrodes. In this manner, the active matrix surface of the LCD arrangement would become so coarse that the structure of the LCD arrangement would be visible on the photographic paper upon exposure. Furthermore, such a reduction of the active surface causes a corresponding reduction in the achievable light intensity modulation. This is avoided in accordance with the invention.

Counter electrodes, separate from the electrodes are provided on the second transparent plate, as is known in principle. Between the electrode planes, the space with the liquid crystal fluid is provided for the generation of an electrical field to achieve a correlation or percolation among the crystal components of the liquid crystal fluids. Good results have been achieved when openings were formed in the first plate for the conductive regions, the edges or walls of which were at least partly covered or coated with a conductive material. The openings in the first plate can thereby be provided, for example, with a photographic mask and wet or dry etching techniques. A photo lacquer mask can be applied to the first plate for the formation of openings, which is insensitive to hydrofluoric acid. An etching with hydrofluoric acid then leads to the formation of openings, the edges or walls of which can then be coated with a conductive material by conventional techniques.

Especial advantages result when the electrodes or counter electrodes are made of a material which at least in the visible range of light is at least essentially transparent. It is also possible to form the electrodes and counter electrodes as conductor frames which surround the picture element regions or net-like cover them, however, such electrodes would lead to the generation of dispersion effects or the pattern of the LCD arrangement would be apparent on a print. Such a solution would also be associated with light loss and a reduced degree of modulation.

Accordingly, at least one of the feed conductors or feed conductor planes, which are associated with the electrodes or counter electrodes are manufactured from a material which is at least essentially transparent at least in the visible range of light. The same goes for the coating which within the openings in the first plate forms the conducting regions or passages.

A transparent material which can also be made conductive is ITO (indium tin oxide). This material can be applied evenly thin on a surface with conventional techniques, structured, and employed as a conductor which at the same time is essentially transparent for visible light.

It has been found especially advantageous when the transparent plates of the LCD arrangement in accordance with the invention are provided with a light or radiation sensitive additive, preferably a silver-containing additive, so that the conductive regions or openings can be produced with appropriate treatment. Correspondingly, transparent plates of glass are thereby provided with a mask which corresponds with the opening pattern for the formation of the conductive regions. An illumination or irradiation through the mask structure follows so that the condition of the regions including the silver-containing additive which can be irradiated through the openings in the mask structure is changed in order to be then especially sensitive to a structure etching. The FOTURAN® (registered mark) glass of the company Schoft has proven especially advantageous. This material is a photo sensitive material which can be selectively structured in different ways. One starts thereby with a photo structuring. A mask is applied to the photo sensitive glass. The masked glass is subjected to UV irradiation, whereby the regions not covered by the mask react photo chemically. Subsequently, the mask is removed and the glass tempered. Finally, an etching with hydrofluoric acid or the like is carried out, which provides an especially advantageous hole structure. Because of the relatively sharply defined irradiation, the subsequent etching produces holes or openings with relatively sharp and even edges, whereby advantageously absolutely no under-etching takes place. Accordingly, the edges or walls of the openings can be coated relatively well, for example, with the above discussed ITO coating.

Alternatively, it is also possible to equip the first transparent plate, for example, with the conducting regions. A masking of the first plate could hereby also take place whereby material could subsequently be introduced selectively into the first transparent plate to form the conductive regions, by way of a thermal doping or by way of a bombardment with conductive particles in an accelerator.

In order to be able to guarantee the most even surface covering, the feed conductors should have as large an area as possible. Furthermore, the electrodes and counter electrodes respectively should have as large a surface area as possible. By forming the electrodes, the feed conductors to the electrodes, the counter electrodes, and the feed conductors to the counter electrodes with a large surface, it can be guaranteed that the light passing through the light path of an exposure arrangement is treated evenly, so that a disadvantageous influencing of the exposure process is avoided. The electrical resistance of the feed conductors becomes smaller with the larger surface.

When openings are provided in the first plate for connection of the feed conductors to the electrodes, the regular hole structure influences the light during an exposure process. In order to reduce this effect as much as possible, the openings are filled, as much as possible, with a largely transparent filler material, such as a synthetic resin, a putty or the like preferably air free, or without gas enclosures. This is also necessary so that the liquid crystal remains encased.

In order to avoid a negative influence of the light spectrum of a light source in an exposure arrangement on the LCD arrangement according to the invention and especially its liquid crystal fluid, the LCD arrangement can be provided in accordance with the invention with a UV protection. The UV protection is applied to at least one of the plates.

In order to reduce the number of connections to the LCD arrangement in accordance with the invention, respectively two counter electrodes of two adjacent picture elements are supplied through a common feed conductor with signals, especially AC signals (duplex operation). It must thereby be considered that it is especially preferred to equip the LCD arrangement in accordance with the invention with PDLC as liquid crystal fluid, which cannot be exposed to direct current components, since PDLC (Polymer Dispersed Liquid Crystal) components are affected or destroyed by direct current, as are most other materials for LCDs. Accordingly, it is preferred according to the present invention to provide the LCD arrangement with features according to the invention with a PDLC material as liquid crystal fluid. With regard to the PDLC materials, reference is made to Hikmet R.A.M.: "Electrically induced scattering from anisotropic gels", J. Appl. Phys., Vol. 68 Nr. 9, pages 4406–4412, November 1990, whereby the content thereof is expressly made part of the content of the present disclosure. Individual substances or several of the PDLC substances disclosed therein, also in combination, are incorporated into the present disclosure.

A multiplex operation for the LCD arrangement with features according to the invention is of course also possible, but a duplex operation is preferred, whereby a combination of two respectively adjacent picture elements takes place, whereby two systems of counter electrodes with combined picture elements are used which are controlled with different, for example, complementary signals, for the reduction of the required connections and feed conduits.

In order to guarantee an especially advantageous control of the picture elements of the LCD arrangement in accordance with the invention, they should be constructed in such a way that they can be supplied with binary AC signals. It is important that the voltage difference present across the LC (liquid crystal) is mean value free. Of course, alternating analog signals can also be used here for the control. It is thereby preferred to place signals on the electrodes of the picture elements or the feed conductors which in the transparent condition of the picture elements essentially average out over time or add up to an electric field, the effective value of which is essentially zero or lies below the percolation or correlation limit of the liquid crystal fluid. Otherwise, it is preferred to place signals on the electrodes of the picture elements or their feed conductors which in the non-transparent or light reflecting and/or absorbing condition average out over time or add up to an electric field, the effective value of which is above the percolation or correlation limit of the liquid crystal fluid. With regard to the PDLC materials it is thereby essential that the signals, as already mentioned, are alternating or AC signals. Direct current, or direct voltage components in the control signals for the electrodes of the picture elements are however to be avoided as much as possible.

An especially preferred process, also in view of its simplicity, consists in placing signals on the electrodes of the picture elements which either average out or add up such that the picture elements are transparent, or such that they are not transparent, whereby an amount of light to be passed through per picture element is adjusted over that time over which the picture element is not scattering or scattering.

In order to take into consideration different colour sensitivities of a print material to be exposed, each of the colour ranges for which print material to be exposed has a specific sensitivity can preferably be considered separately, whereby preferably a colour selective filter arrangement is employed. Colour filters can thereby be moved into the light path of the exposure arrangement and for each of the filters an exposure can respectively be carried out, whereby different picture elements can be maintained transparent or non-transparent over specific times, which means for example maintained scattering or non-scattering within a specific temporal relationship.

The process in accordance with the invention for the manufacture of a LCD arrangement with the above listed advantages is based on the following steps: First, a plate, or the first plate, preferably of transparent material, especially FOTURAN®, is provided with an opening mask which is employed for manufacture of the conductive regions or passages. The first plate is then subjected to a material removing treatment in order to form the openings in the first plate. A material which is substantially transparent in the visible range of light is subsequently applied to both sides of the first plate. This material, preferably ITO, is firstly used to form the electrodes of the picture elements of the LCD arrangement and secondly to form the conductive tracks and passages for supply of the control signals to the electrodes. The second plate is coated on one side with ITO and structured for formation of the counter electrodes and subsequently affixed to the first plate, spaced apart parallel thereto. A liquid crystal fluid is then filled into the space between the two plates, preferably PDLC.

The transparent material, preferable ITO, is rendered conductive by way of a heat treatment. The coating material, in the case of ITO, is made transparent after the structuring by way of a heat treatment. Initially after the vapor depositing the thin layer is not transparent, but easily etched (HCL). After the tempering (oxidation), it is transparent but only etched with difficulty (hydrofluoric acid). Otherwise, transparent material could of course also be made conductive by a doping or the like. So could, for example, a completely closed material layer or a glass be used directly and doped superficially such that a transparent property and electric conductivity would only be present in the electrode or conductor regions. For example, a masking coating of aluminum oxide ($Al_2O_3$) on a glass substrate, such as FOTURAN®, could be applied to subsequently introduce a temperature initiated doping or a doping based on bombardment with boron ions or the like such that an electrode or conductor structure is produced. This method has then the advantage that an even structure would be present, whereby however a comparatively high doping would be required to provide the required conductivity. In the case of a doping by way of ion bombardment, optical scatter centers could be created which can lead to disruptions.

When the first plate is subjected to the material removing transformation to generate the openings for the conductive regions in the first plate, this can be carried out be way of a reactive processing, for example a dry or wet etching. When FOTURAN® is used, etching can be carried out by way of hydrofluoric acid.

Conventional vapor deposition or sputtering technology can be used for the application of the material onto the first and/or second plate, whereby this material is essentially transparent in the visible spectrum. When the first plate is being coated, it can be first coated on one side and then on the other. The coating of the both sides can be carried out sequentially, but gripping arrangements with transmissions, for example planetary drives, are available which are able to carry out a complete surface coating. It is thereby essential that the first plate is rotated at an angle to the vapor or sputtering material source, at about an angle of 35 to 60°, preferably 45°, in order to coat the openings or their walls, whereby also an edge covering between the plate surface and the walls of the openings is essential. The first plate can thereby also carry out a tumbling movement whereby preferably a mean inclination of 35 to 60°, especially 45°, to the vapor or sputtering material source is very advantageous.

As already mentioned above, a cover layer should be applied upon completion of the LCD arrangement according to the invention which is UV reflecting or UV absorbing. This can be in the form of a UV protective glass or in the form of a UV protective foil. After the coating, the openings for the conductive regions in the first plate can be at least essentially filled with at least essentially transparent material. Of course, it is especially advantageous when the openings can be completely filled, since air bubbles or the like can be disadvantageously significant as light scattering centers. A transparent material can thereby be inserted into the openings, heated, and subsequently subjected to a vacuum, so that present or remaining air bubbles can escape because of the low outside pressure.

The UV-reflecting or -absorbing cover layer or the UV-protective glass or the like can be adhered onto the first plate simultaneously with the filling of the openings for the conductive regions using the synthetic resin, putty or the like.

Counter electrodes and feed conductors therefore are formed on the second plate. Since in a preferred embodiment according to the invention a duplex control is maximally possible to achieve the required contrast ratio for the PDLC-LCD arrangements preferred according to the invention, respectively only two picture element electrodes can be controlled with one and the same signal. This allows a reduction to half the number of the required signal feed conductors. For example, for a 20×30 matrix from 600 to 300. In place of a single counter electrode, two separate counter electrode systems with different, for a duplex operation suitable signals are then to be controlled.

However, it must be pointed out that other processes can of course be used for the manufacture of the openings in the transparent plate. The required openings, for example, can also be achieved by way of a laser.

BRIEF DESCRIPTION OF THE DRAWINGS

The present invention will be discussed in the following by way of preferred embodiments which are provided with features according to the invention. Further features, goals and advantages according to the invention will thereby be disclosed with reference to the attached illustrations, whereby:

FIG. 7A shows a section from the conductor plane of the LCD arrangement according to FIG. 7;

FIG. 10 shows switching curves of an LCD arrangement with features according to the invention;

DETAILED DESCRIPTION OF THE PREFERRED EMBODIMENT

In the following, equal reference numbers refer to equal parts or devices.

Figure 1:
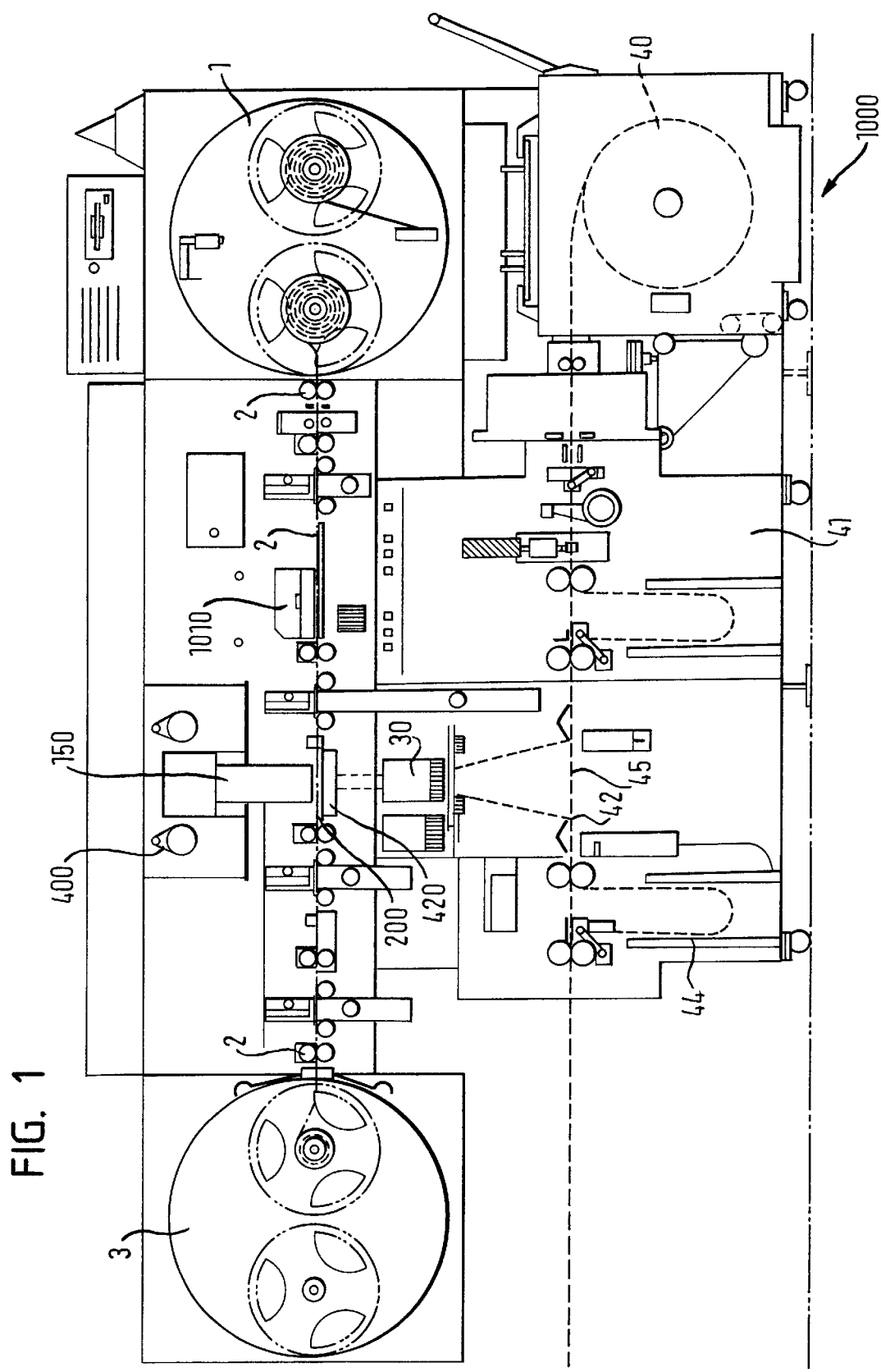
FIG. 1 shows the construction of a photographic copier apparatus in accordance with the invention.

FIG. 1 shows the construction of a photographic copier apparatus which is in the following also referred to as photographic printer. The photographic printer includes an unwind arrangement 1 for the unwinding of an exposed film 200, which serves as photographic original, a transport arrangement 2 for the transporting of the film to a windup arrangement 3, furthermore, a film stage 420 on which an image of the film is positioned in order to be shown through by way of the illumination system 400. The light exits the illumination system 400 through the light duct 150. The liquid crystal matrix is also positioned in this light duct 150.

During the transport from the unwind arrangement to the film stage 420, the film is scanned by an internal scanner 1010. In the interior of the housing shown in FIG. 1, light conductive fibers guide the captured light to a not illustrated spectral photometer within the copier apparatus 1000. The image data of the original material (film) captured by the internal scanner are used for the control of the liquid matrix.

The shown through film is projected through a lense system, especially a zoom lense or an exchangeable lense onto a paper stage 42 on which copier paper or photo paper 45 is found which functions as copier material. This photo paper is transported from an unwind arrangement 40 through a conveying arrangement with a buffer 41 to a paper stage 42. Subsequently, it is transported through a further buffer arrangement 44. A developing arrangement for the developing of the exposed photo paper follows thereafter.

Figure 2:
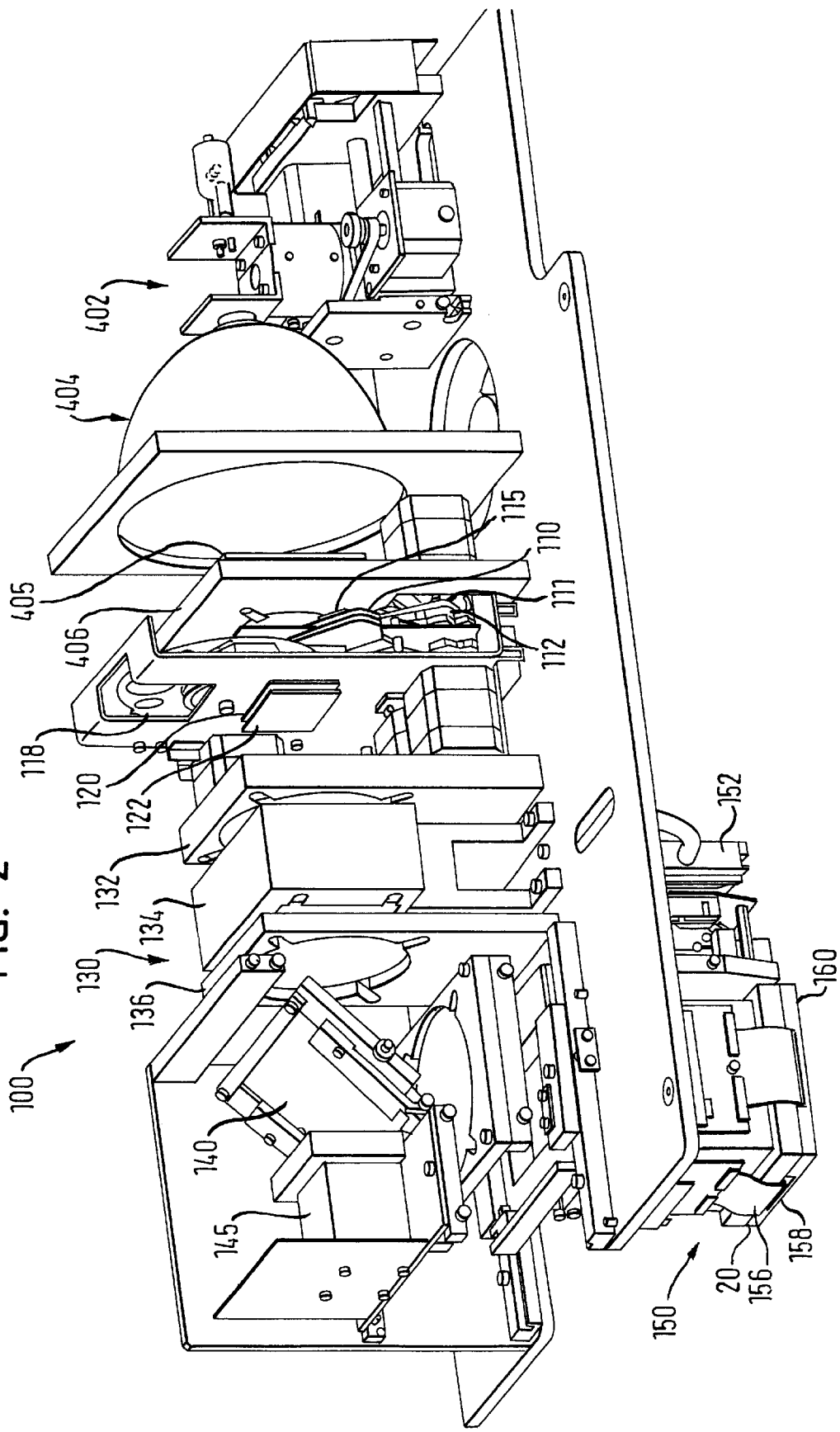
FIG. 2 shows a perspective view of an illumination system in accordance with the invention.

FIG. 2 shows a perspective view of the illumination system 400. A lamp socket for the automatic exchange of a lamp is shown at 402. 404 shows the parabolic reflector which bundles the light emitted by the lamp found within the reflector and guides it to a first distributing lense 406. A heat protective filter 405 is provided before this lense which does not allow the passage of unfurred radiation. Reference numerals 110, 111 and 112 define disk-shaped, pivotable colour filters for the colours magenta, cyan, yellow, which can be swivelled into the light path in order to allow passage of only light of one specific wavelength range. Undesired colour accentuations or colour tinges in the exposed photo paper can be avoided by directed additional exposure with only one or two colours. One of the filters is thereby, for example, moved into the light path for a preselected amount of time during the exposure time of the photo paper.

Furthermore, a shutter 115 is provided which interrupts the light path and by which the exposure time can be adjusted. An extenuating wheel 118 is provided in combination with the shutter 115. This extenuating wheel includes gray filters of different transmission. Thus, in combination with the shutter, the desired exposure can be achieved. Especially, the exposure time can be maintained within a certain range. This is advantageous, since the film original and the photo paper are always transported at high speed to the film stage and the paper stage. Highly varying exposure times would highly stress the mechanic for the transport of the film and the photographic paper, since then speed changes during the transport of the photographic paper would have to be carried out continuously which cannot be compensated by the provided buffers. Exposure times which are too short are furthermore mechanically not realizable or only with low accuracy. A control arrangement is preferably provided which controls the insertion of a gray filter into the exposure light path so that the exposure time remains within a predetermined range. Preferably, the control arrangement therefore selects one gray filter out of several suitable gray filters. The control arrangement uses measured data, especially regarding the intensity of the exposure light (see below), and especially from a previous optical scanning of the copier original to be shown through.

Subsequent to the extenuation wheel, a comb filter 120 and a balance filter 122 are provided. The comb filter 120 allows the passage of light within certain preselected spectral ranges. For example, in the range of 420 to 470 nm, 535 to 555 nm and 656 to 730 nm. The spectral regions are adapted to the spectral sensitivity of the photographic paper for the production of colours on the photographic paper. In addition to a spectral adaptation of the exposure light, an intensity adaptation is also carried out by way of the balance filter. The latter ensures that ease of the three wavelength regions picked out by the comb filter 120 impinges on the photographic paper with an intensity adapted therefore.

130 designates a collimator arrangement for rendering parallel the light with two lenses 132, one integrator lense 134, and a further lense 136. The integrator lense is also referred to as honeycomb lense or integrator plate. In the present case, two integrator plates are provided.

The exposure light exiting the lense 136 is then reflected off a mirror 140 and downwardly redirected to a further lense 142. From there, the light then enters into the light duct 150.

The mirror 140 is partially transparent and a part of the light is captured by an exposure light monitoring system 145. The detected light signal is analysed and serves the control of the colour filters, the extenuators (gray filter) and the shutter.

A liquid crystal matrix 20 is provided at the lower end of the light duct 150. Electrical signal feed conduits 156 enter into the light duct through an opening 158 and serve the control of the liquid crystal matrix. The light duct 150 is closed at the lower end by a scattering disk 160. The light duct 150 is preferably black on the inside.

An interface 152 is provided for the control of the liquid crystal matrix which is in connection with a not illustrated control arrangement and delivers the control signals for the control of the liquid crystal matrix.

Figure 3:
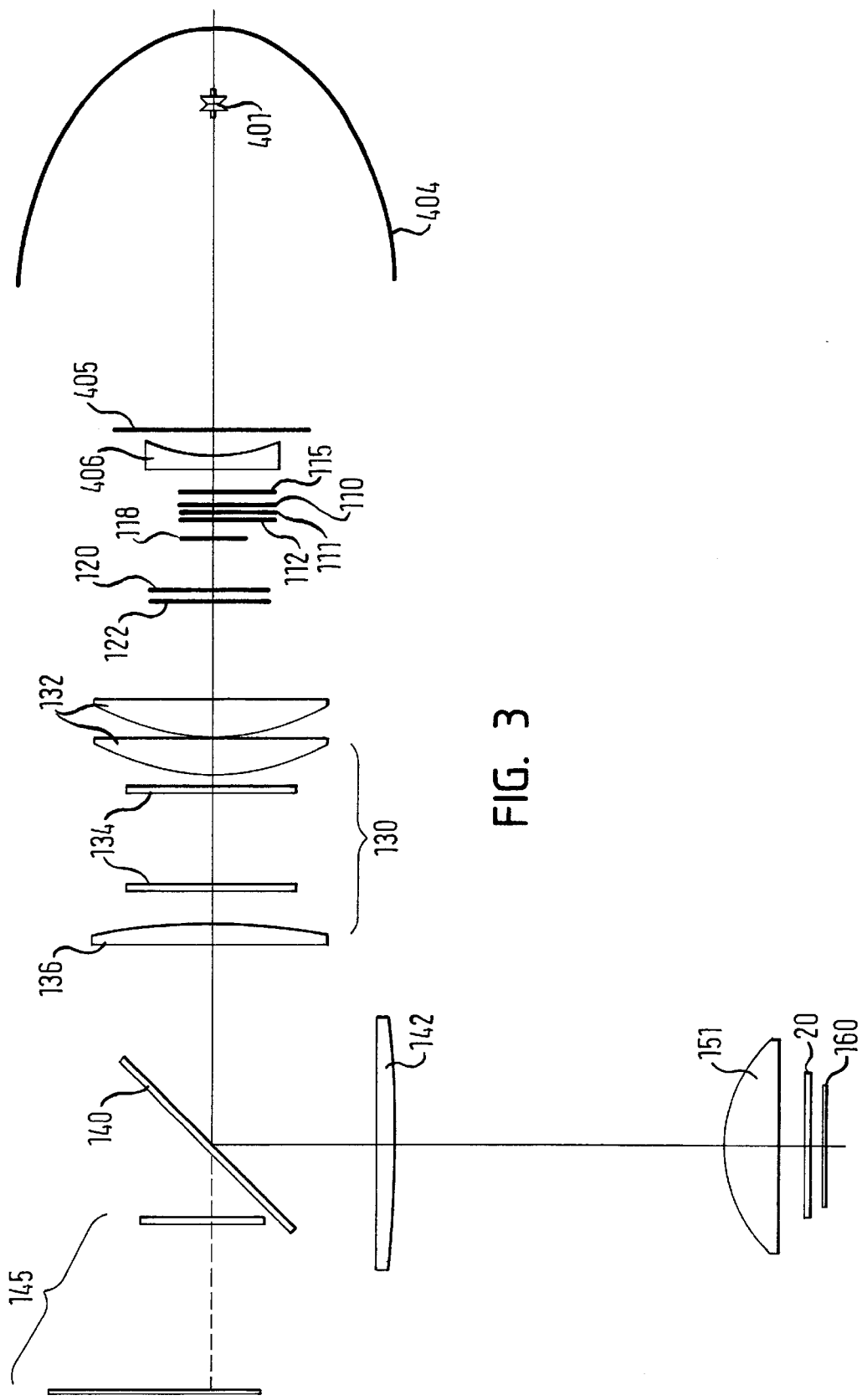
FIG. 3 shows a schematical overview of the arrangement of the optical components in the illumination system in accordance with the invention.

FIG. 3 shows a schematic overview of the arrangement of the optical components within the exposure system. The same reference numbers correspond to the same elements already discussed in FIG. 2 so that a description thereof is omitted. In addition, a lense 151 is visible in FIG. 3 which is found in the here not illustrated light duct 150. As already described above, located under the lense 151 are the liquid crystal matrix 20 and thereunder the scattered disk 160.

Figure 4:
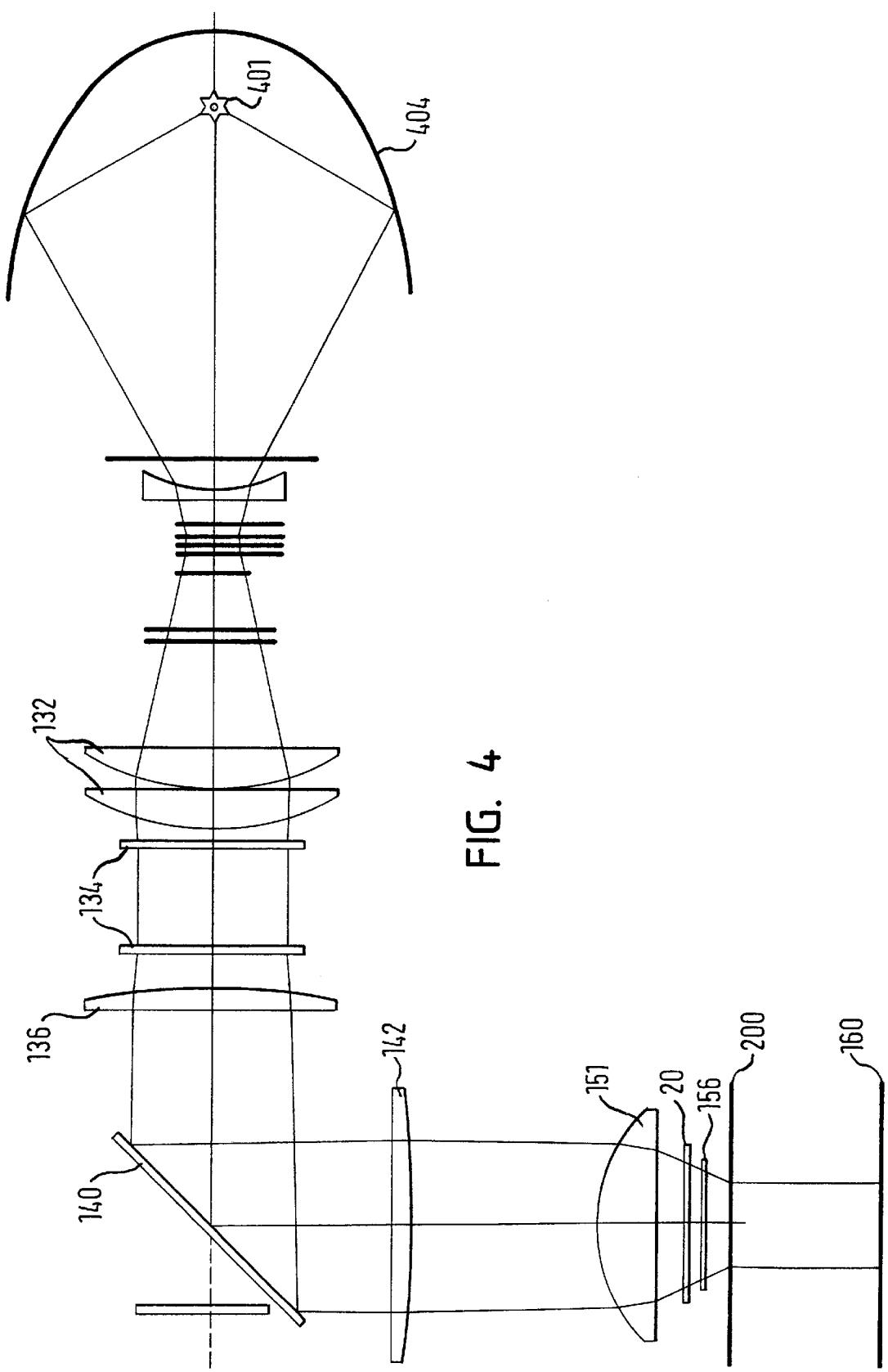
FIG. 4 shows the light path through the illumination system in accordance with the invention.

FIG. 4 shows the light path through the exposure system, whereby here the optical filters were omitted. The same reference numbers designate the elements already discussed above. From the light path, it is here clearly apparent that the liquid crystal matrix 20 is only unfocused superimposed to the film 200 which is positioned on the film stage 420 shown in FIG. 1. The film 200 is then projected onto the photographic paper by a lense which is not shown in this Figure (lense 30 in FIG. 1). A diaphragm 160 is positioned before or after the lense.

Figure 5:
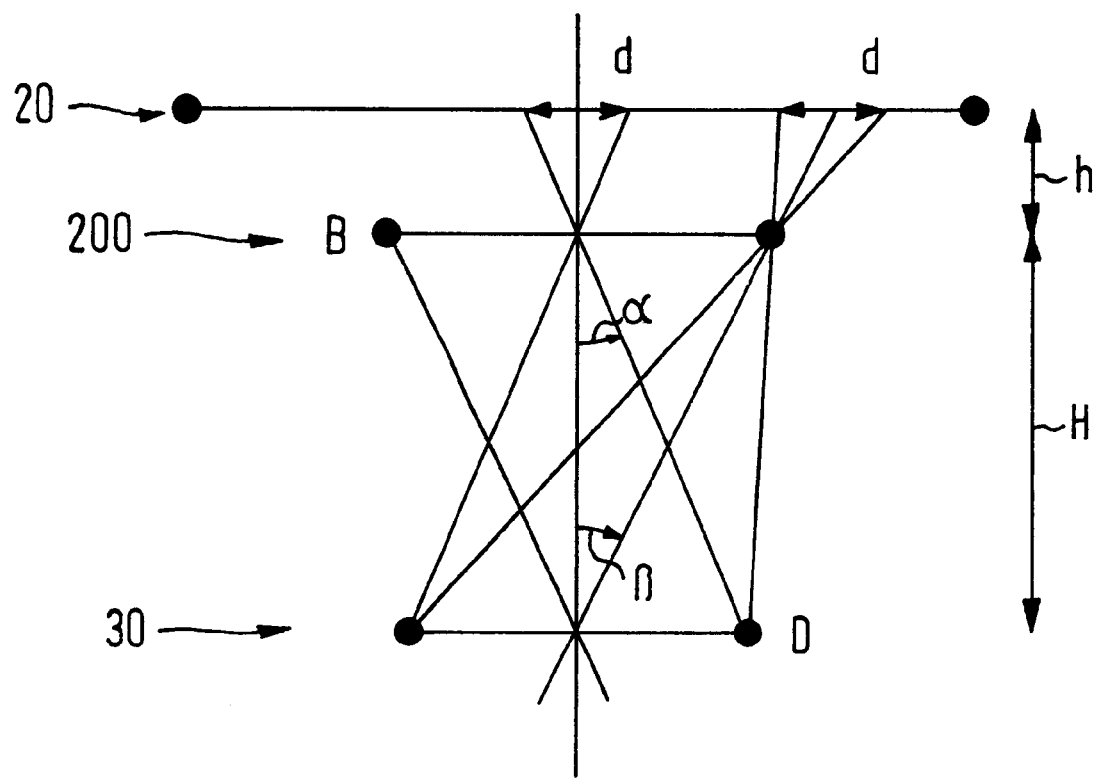
FIG. 5 shows the optical projection relationships in the illumination system in accordance with the invention.

FIG. 5 shows the optical projection relationships. The reference number 20 designates the plane in which the liquid crystal matrix is located. The reference numeral 200 designates the plane in which the film is located and the reference number 30 designates the plane in which the lense system or the lense is located which projects the film onto the photographic paper.

The optical lengths present during the exposure are schematically illustrated in FIG. 5. The following relationships thereby apply.

$$\frac{D}{2H} = \text{tg}\,\alpha \quad \text{numerical aperature} = 0.07 \ (\alpha = 4')$$

$$\frac{B}{2H} = \text{tg}\,\beta \quad \text{numerical picture aperture}$$

$$\frac{h}{H} = \frac{d}{D} \quad \text{defocussing}$$

$$\frac{d}{B} = \frac{h\,\text{tg}\,\alpha}{H\,\text{tg}\,\beta} \quad \text{blurriness}\,(=0.1)$$

The above defined blurriness preferably lies in the range of 0.05 to 0.2, especially preferably at about 0.1.

According to the invention, it is preferred that the LCD arrangement includes a PDLC-material as liquid crystal material, since this allows a significantly better light gain. If another material were used, the light source 12 would have to be upgraded, for example, from 500 watts to about 2500 watts in order to let sufficient light pass. Of course, the exposure time could also be significantly extended, whereby then however a duration per individual exposure of an average 150 ms would decrease the efficiency of a corresponding exposure arrangement so that the photographic copier would hardly be competitive because of its low throughput.

Figure 6:
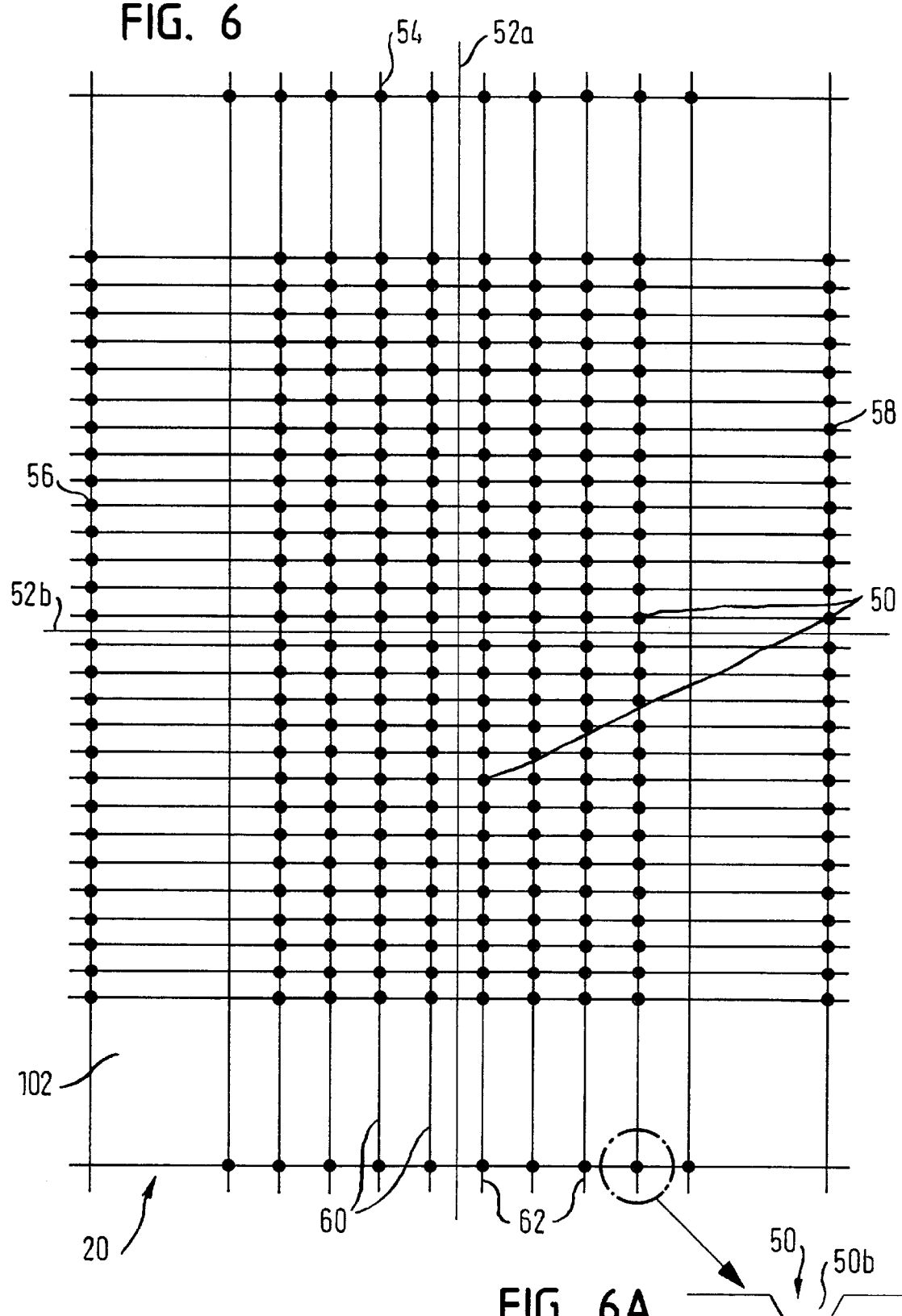
FIG. 6 shows an arrangement of an LCD device with features according to the invention.

FIG. 6 illustrates a transparent plate 102 of an LCD arrangement 20 with features according to the invention. This transparent plate which is referred to in the claims as first plate, includes different openings in order to thereby produce conductive regions or passages in the plate 102. The conductive tracks are guided to the edge of the plate ("connector" in FIG. 9), so that later a connection of the matrix by way of "flexiprints" is possible.

Figure 7:
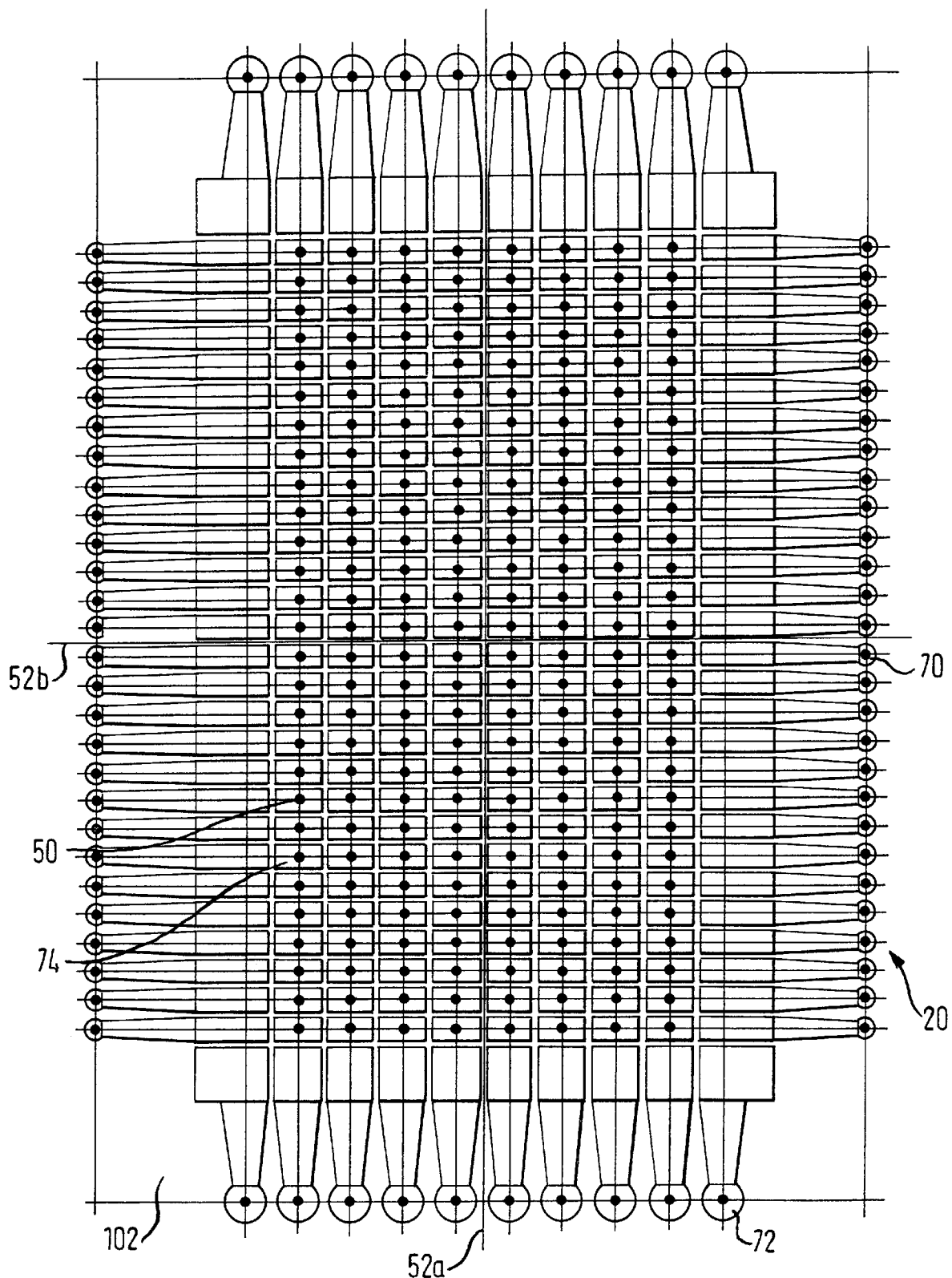
FIG. 7 shows an electrode plane of an LCD arrangement with features according to the invention.

The openings 54, 56, 58, 62 have exactly the same function as the central openings 50, which means they function as passages for the (peripheral) electrodes of the LCDs. However, in order to leave sufficient space for the feed conductors (FIG. 7A), they are not (contrary to the central openings) placed over the center of the corresponding picture element pair, but displaced further outwardly. The connections for the peripheral electrodes in FIG. 7 are correspondingly outwardly elongated.

As is apparent, the plate 102 or the opening pattern of the plate 102 is symmetrical to the axis 52a and 52b, whereby in the later operation of an exposure arrangement according to, for example, one of FIGS. 1 or 2, the optical axis of the arrangement extends through the crossing point of the straight lines 52a, 52b.

Later to be provided conductive tracks can of course also have a rounded path, however, it is preferred that they extend essentially straight and parallel to the construction help lines 60, 60a (for this, see also FIG. 7A).

Figure 6A:
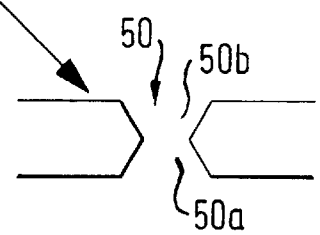
FIG. 6A shows an opening for a conductive region or an electrically conductive passage in an LCD arrangement with features according to the invention.

If possible, the openings 50 should have a specific geometrical shape which does not render the coating of the walls of the openings 50 excessively difficult. A typical geometrical shape of an opening 50 is accordingly apparent from FIG. 6A, which shows that the wall is bi-conical so that at a corresponding application angle of a vapour deposited or sputtered material, the walls of the openings are also continuously coated. Of course, one must thereby also ensure that the diameter of the opening 50 at the upper edge is sized such that the edges do not have a shadowing effect during the coating process. Correspondingly, the ratio between opening diameter and opening length, which means the thickness of the plate 102, must be appropriately adjusted. Because of the wet etching and the specific behaviour of a glass material including a photosensitive silver compound, the opening portions 50a and 50b are respectively conical or have a trapezoid extent so that overall a opening profile with reduced central diameter results.

Correspondingly, the following purely exemplary dimensions can result for a plate 102. The hole diameter can be 0.3 mm, while the hole depth is 0.5 mm, which means the plate 102 is 0.5 mm thick. The region of interest for a control of the light intensity extends over a region which is both smaller than the rectangle defined by the outermost rows of the openings 50 and larger than the rectangle defined by the second outermost rows. For example, an active matrix region can hereby result of about 30 mm in direction of the axis 52b and of about 45 mm in direction of the axis 52a. The spacing of the openings 50 in the active region of the plate 102 can be about 3 mm in direction of the axis 52b, while the spacing between the individual openings 50 in the direction of the axis 52a, for example, can be about 1.5 mm. Possible further dimensions and size relations result from the mentioned exemplary dimensions, since they can be used as an exemplary base for the further dimensions for an exemplary reproduction to scale, also with respect to the FIGS. 7, 7A, 8 and 9.

FIG. 7 illustrates a plane of picture element electrodes 74 on an LCD arrangement 20. The picture element electrodes 74 respectively include about centrally the openings 50 with the conductive regions or passages, which connect the picture element electrodes 74 to the conductor tracks which are positioned on the opposite side of the plate 102. Although the conductive regions or openings 50 are illustrated here centrally to the picture element electrodes 74, they can also be placed differently. The connections 72, 70 are respectively used for connection of one or possibly several picture element electrodes 74. The conductor tracks can thereby be extended to the edge of the plate so that a later connection with the above-mentioned "flexiprints" is made possible.

FIG. 7A illustrates a plane with feed conductors 51, which transmit the signals for the picture electrodes 74 according to FIG. 7 from the connections 70, 72 to the openings or connective regions 50, which then lead through the conductive regions through the first plate 102 (see FIG. 7), to the picture element electrodes 74. The feed conductors 51 should thereby have as large an area as possible in order to subject the light which passes through the LCD arrangement 20 to constant conditions as much as possible. The spacing between the individual picture element electrodes 74 or between the conductors can thereby be adjusted to between 10 $\mu$m and 50 $\mu$m. Manufacturing tolerances on one hand and disadvantages because of electrical short circuits between the electrodes should be avoided in this manner, while at the same time the light passing through the LCD arrangement 20 is not or only slightly negatively influenced.

Figure 8:
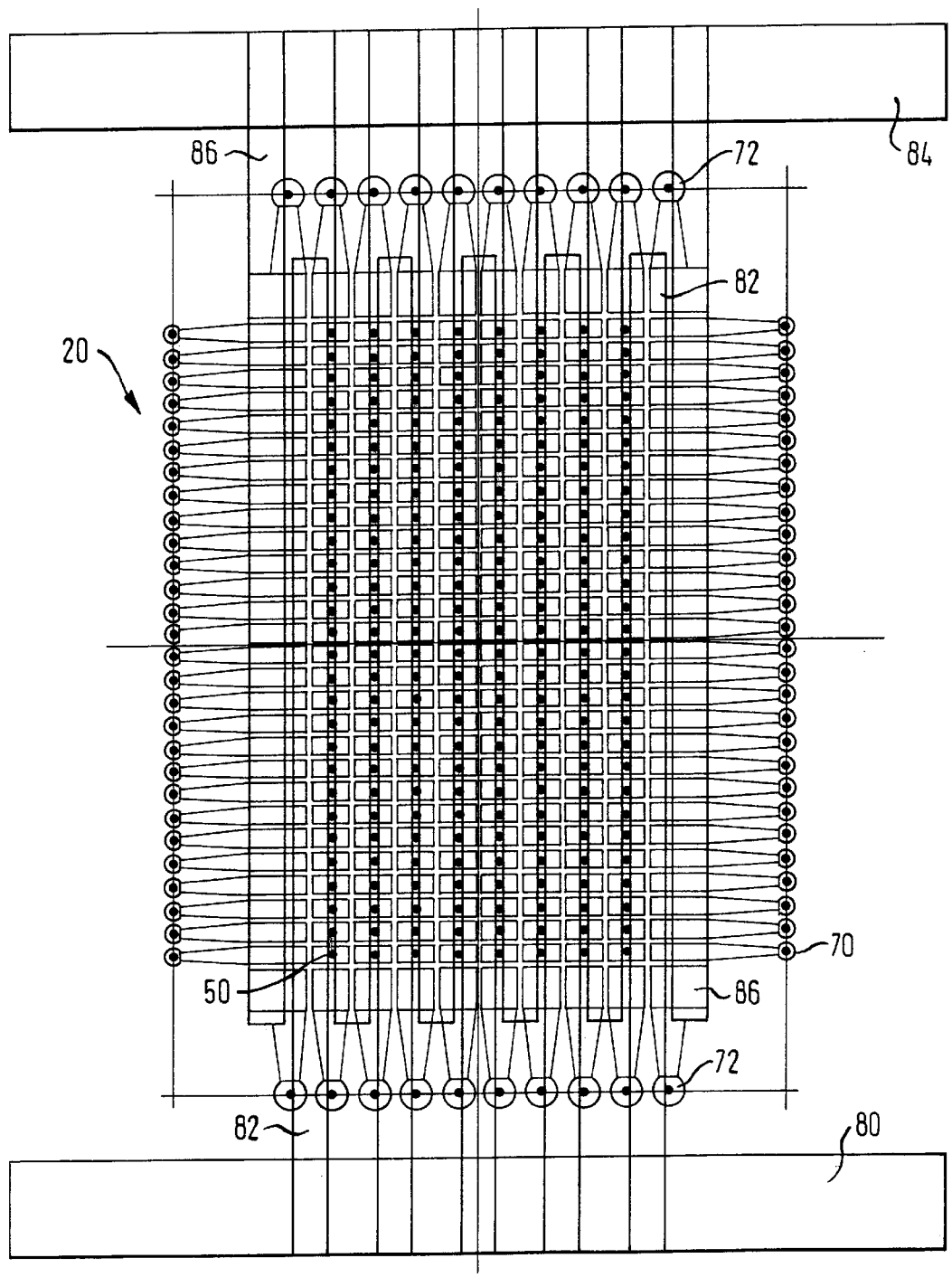
FIG. 8 shows the LCD arrangement according to FIGS. 6, 7, 7A with an additional plane with counter electrodes.

FIG. 8 shows in addition the plane of the counter electrodes 82, 86 which according to a duplex process are positioned respectively opposite to adjacent picture element electrodes 74 (see FIG. 7). Control of the counter electrodes 82, 86 is carried out through contacts or contact patterns 80, 84. The counter electrodes are thereby provided on a separate plate of transparent material, the second plate (104 according to FIG. 9A).

Figure 9:
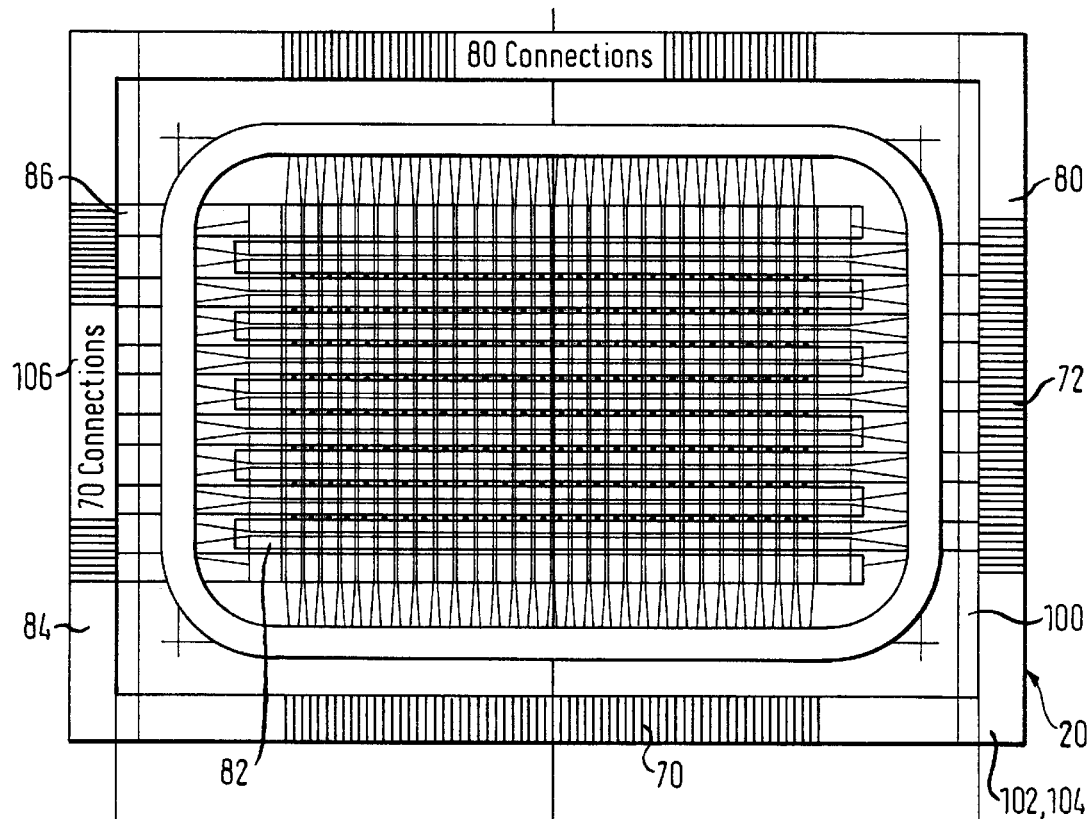
FIG. 9 shows the LCD arrangement according to FIGS. 6 to 8 in top plan view.
Figure 9A:
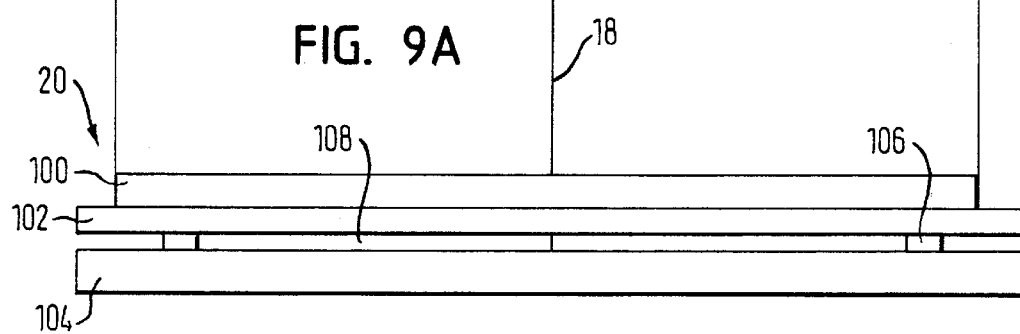
FIG. 9A shows an LCD arrangement according to FIG. 9 in cross section.

The different components of the first plate 102 are here also shown because of the transparency of the LCD arrangement according to the invention, however, they are not discussed again, since they have already been described with reference to FIGS. 6, 7 and 7A. FIG. 9 or FIG. 9A show the total components of an LCD arrangement with the different planes according to FIGS. 6 to 8 and in an overall view. A UV-protection plate 100, preferably of glass, covers at least the volume 108 in which the liquid crystal fluid is found. The liquid crystal fluid volume 108 is produced by spacers 106 between the plates 102 and 104. The connections at the edges of the plate 102 are outwardly extended so that the LCD arrangement 20 can be relatively easily contacted by way of clamping plugs or flexiprints or the like. The number of connections is apparent from FIG. 9.

The plate 102 is preferably made from FOTURAN® (trade-mark of the Schott Company). The plate 104 can be made of simple transparent material, for example, a class of high optical quality.

As already mentioned, all electrodes, counter electrodes, feed conductors and so on which are located in the active region of the LCD matrix, which means in the region which is to be used for the manipulation of picture data, should be made of a conductive, transparent material, especially ITO.

FIG. 10 shows the measured relative light intensity in the plane of the photographic paper for three different embodiments of the PDLC liquid crystal and depending on the effective voltage applied across the electrodes. It is apparent that two principally different embodiments are posssible, namely one which has a scattering effect without an applied voltage signal and another wherein the scattering effect increases with increasing effective value of the applied voltage signal. In both cases, the modulation of the light intensity is achieved in that less light is captured by the lense with increasing scattering. The opening angle of the lense used for the measurements is, for example, about 10°.

It is further apparent from FIG. 10 that a change of the measured light intensity (which means the scattering effect) only occurs after a certain value of the effective voltage. This value is referred to in the following as threshold voltage.

Figure 11:
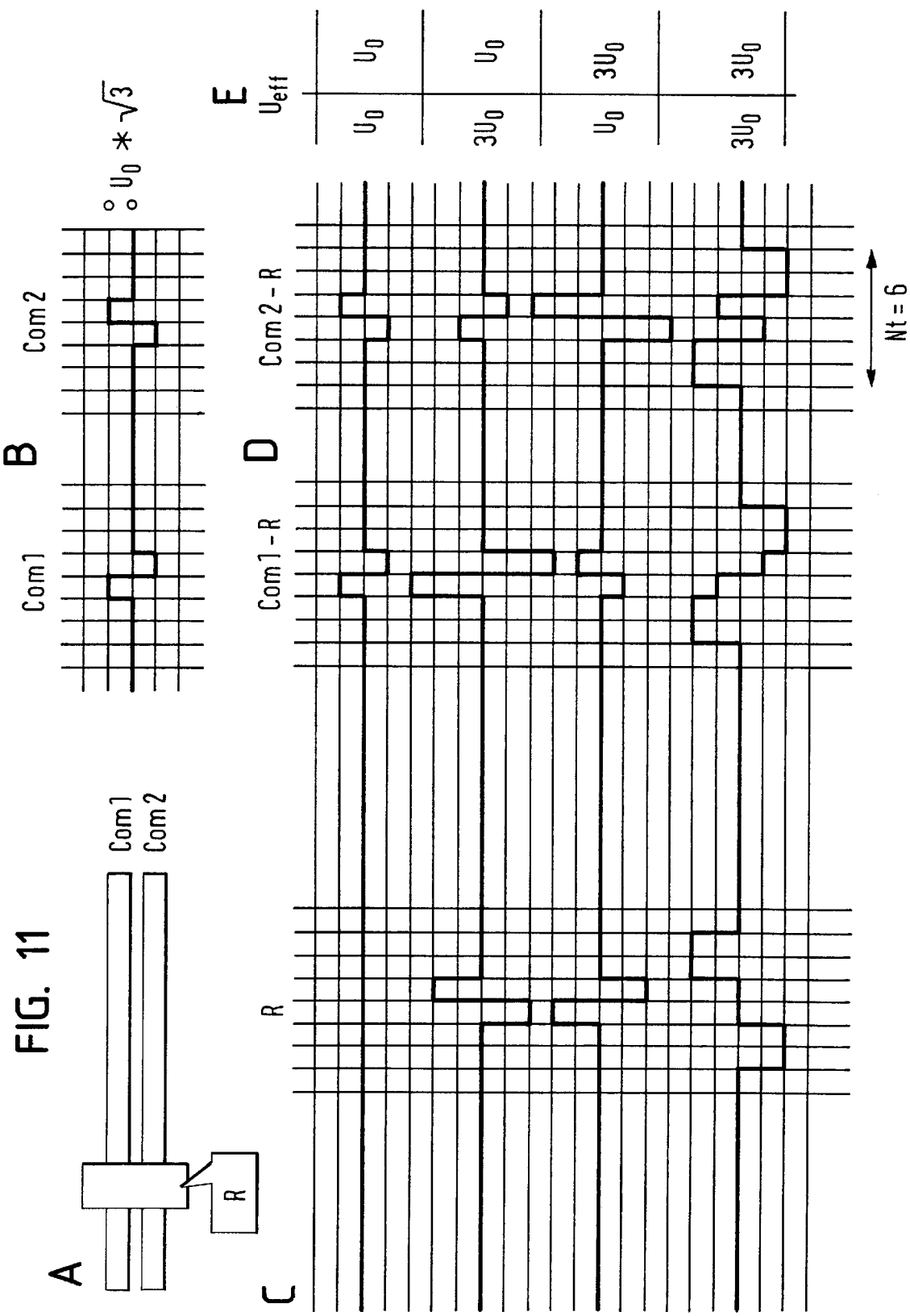
FIGS. 11A to 11E show a control schematic for a picture element pair of an LCD arrangement with features according to the invention.

FIG. 11 shows a possible manner of control of an LCD with voltage signals which represent an optimal duplex control (see Nehring J., Kmetz A.: "Ultimate Limits for Matrix Addressing of RMs Responding Liquid Crystal Displays", IEEE Trans. Electron. Devices, vol. ED-26, S. 795–802, 1979). In this type of operation, two picture elements are respectively combined to a single electrode, whereby the number of required picture element connections and feed conductors is cut in half.

FIG. 11A shows a pair ("R") of picture elements combined to one electrode. Obviously, the scatter effect of the liquid crystal in the region of an individual picture element should be possibly be different. This is achieved in that one uses two counter electrodes (Com1, Com2) controlled with different voltage signals on the side of the liquid crystal opposite the picture elements. In reality, further picture element pairs of the same LCD matrix row are placed left and right of the illustrated picture element electrode "R", which are all placed over the same pair of counter electrodes Com1 and Com2. All further rows of the LCD matrix use counter electrode pairs which are controlled by the same voltage signals as Com1 and Com2 (see therefore FIG. 8). FIG. 8B shows the periodic voltage signals placed on Com1 and Com2 (only one period of these signals is shown which extends over six time intervals).

FIG. 11C (left) shows four different voltage signals, which can be selectively placed on the picture element electrode. For understanding of the duplex process, the signals are best imagined as periodical, although, as explained further below, the four illustrated signals can be combined in a suitable series for the achievement of grey shades. The voltage difference resulting across the liquid crystal and actually in a first approximation its effective value (root of the square of the mean), determines the light modulation effect. The resulting voltage differences are shown in FIG. 11D they are, of course, different depending on whether the corresponding picture element is over the counter electrode Com1 or Com2.

The Table of FIG. 11E shows that in fact four conditions are possible with this control process. The effective voltage over the liquid crystal can selectively be Uo or 3 Uo for each of the two picture elements. Most sensibly, Uo is selected to be about equal to the threshold voltage of the liquid crystal (FIG. 10) so that the voltage modulation factor of 3 can be translated into the largest possible intensity modulation factor (contrast).

This type of duplex control can achieve the largest possible voltage modulation factor.

This factor decreases with increasing order of the multiplex (which means with increasing number of picture elements which are combined to one electrode). For this reason, and because of the relatively flat course of the characteristic line of PDLC liquid crystals, a multiplex of the order 2 (duplex) is preferably used.

The threshold voltage of liquid crystals is temperature dependent (it decreases with increasing temperature). If the effectiveness of the LCD matrix is to be maintained over a large temperature range, it is sensible to control or regulate the amplitudes of the voltage signals (which means Uo) depending on the temperature.

It is apparent from FIG. 11C that tertiary signals are required for the control of the picture element electrodes. The electronic circuitry for the generation of the signals can however be significantly simplified when binary signals are used instead. A possible control with binary signals is described in Appendix A. However, this simplification is achieved to the detriment of the voltage modulation factor which then is only $1+\sqrt{2}$ instead of 3. The described method allows it to place each picture element into one of two conditions (on and off). Although the aesthetic appearance of photographic copies can also be improved with a purely binary LCD matrix, the quality can be significantly improved by the use of intermediate values (grey shadings). Grey shadings can be achieved in different ways with the described control method. The two most advantageous are:

Variation of the ratio $T_{on}/T_{off}$ within the exposure interval $T_B = T_{on} + T_{off}$. Use is here made of the fact that the photographic paper integrates the (variable) light intensity over the whole exposure interval $T_B$.

Temporal multiplexing of the four different picture element electrode signals. A periodic control can so be used, for example, which base period is made of, for example, 16 partial sequences, which can selectively correspond to one of the four signal forms illustrated in FIG. 8C. If the duration of the base period is sufficiently small, the liquid crystal thereby reacts to the effective value of the compound signal, and 16 grey shades can be achieved for each picture element.

Figure 12:
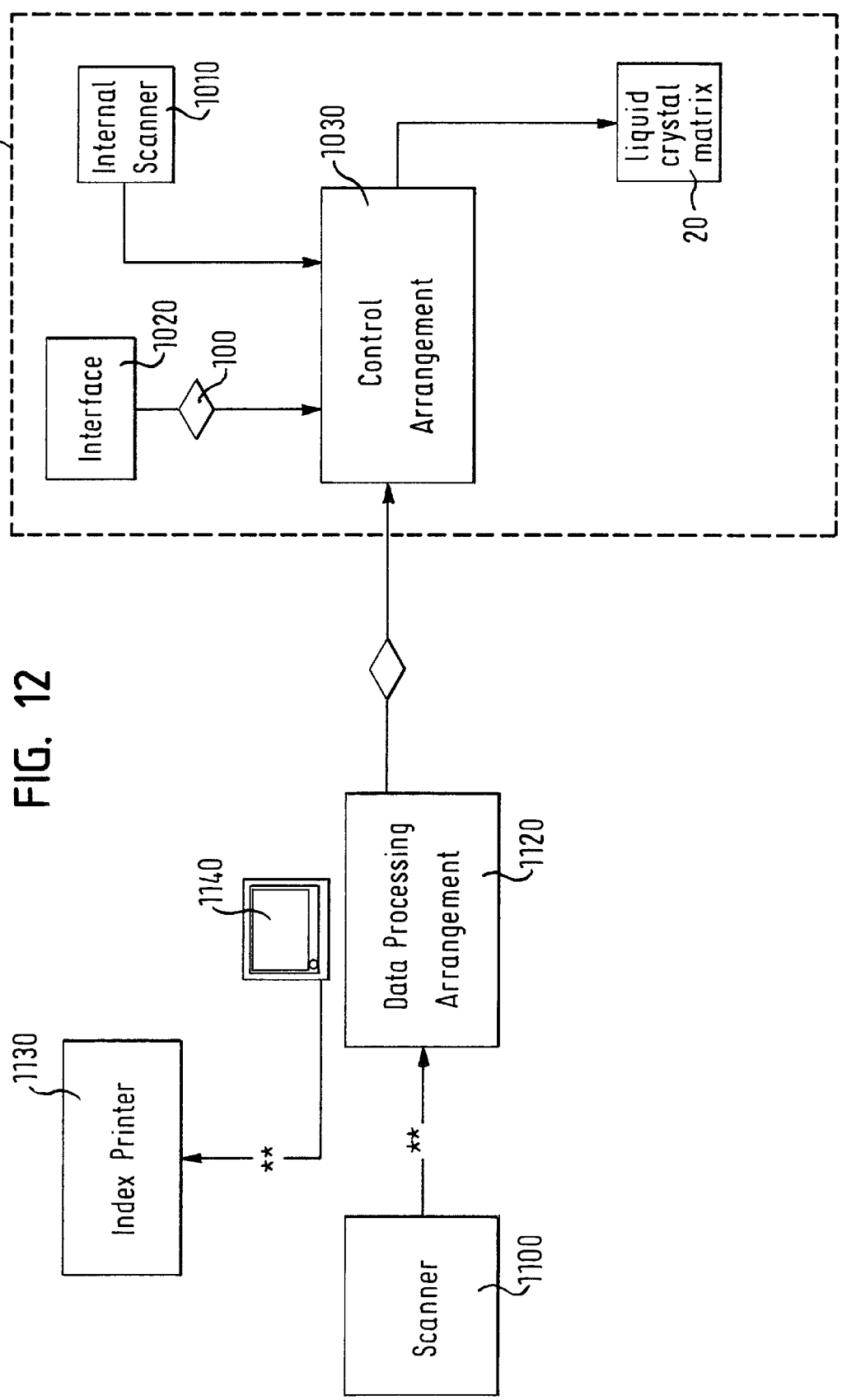
FIG. 12 shows a schematic construction of a copier apparatus in accordance with the invention with an external scanner and index printer.

FIG. 12 schematically shows the copier apparatus 1000 with an internal scanner 1010, liquid crystal matrix 20, interface 1020 to a computer and control arrangement 1030 for control of the liquid crystal matrix on the basis of the data from scanner 1010. The computer can be a personal computer or a computer network. The computer serves to control the operation of the copier apparatus automatically or according to the commands of an operator.

Furthermore, an external scanner 1100 is provided which scans APS films in order to obtain data for an index print. The data obtained by the scanner 1100 are fed to a data processing arrangement 1120 which works up the data for the index printer 1130 for the printing of an index print. Furthermore, the data processing arrangement 1120 processes the scanned image data in such a way that they can be fed to the control arrangement 1030 for the liquid crystal matrix. The resolution of the scanned data is thereby adapted to the resolution of the liquid crystal matrix. This is preferably carried out such that the fitting line and column number results which is required for the control of the liquid crystal matrix. The internal scanner is preferably used for conventional small picture films, while the data originating from the external scanner 1100 and the data processed by the data processing arrangement 1120 are used in the case of APS films. When index prints are to be produced by way of the external scanner, the data obtained thereby for the control of the liquid crystal matrix are preferably used. For example, if index prints are to be produced from a conventional small picture film, the data captured by the external scanner can also in this case be used for the control of the liquid crystal matrix.

The index printer is so constructed that it creates the index print-out by way of a CRT device. CRT stands for "cathode ray tube". By way of the cathode ray tube, normal, light sensitive photographic material is exposed. The index printer can receive the individual pictures which are to be reproduced on the index print-out as digital pictures, write them side by side onto the light sensitive paper by way of the CRT device, develop the paper and finally issue the index print.

A monitor 1140 is preferably used for the display of the data received by the data processing arrangement 1120 and/or the image data originating therefrom.

Figure 13:
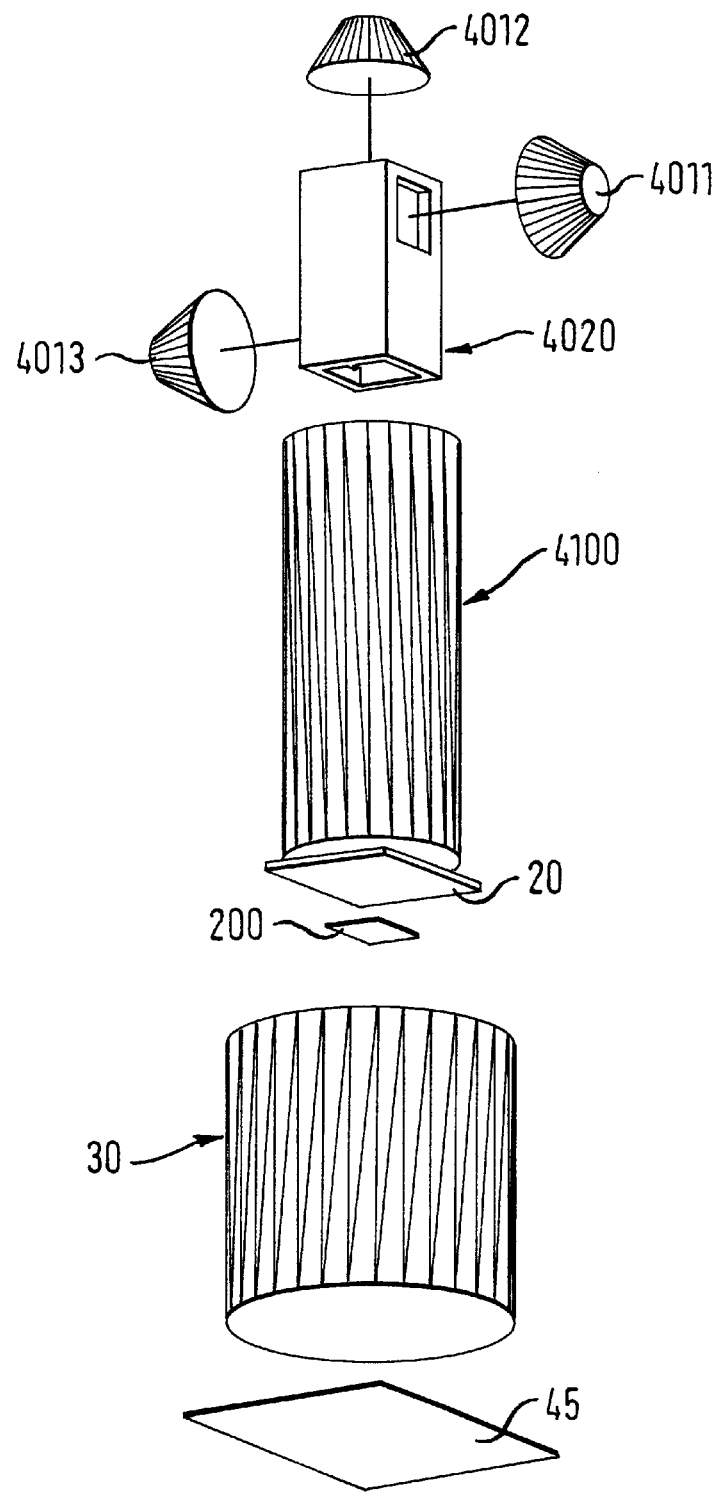
FIG. 13 shows the arrangement of optical components of the illumination system with differently coloured type sources.

FIG. 13 shows an alternative embodiment of an exposure system. Contrary to FIG. 1, not only one single light means 401 is used, but three lamps 4011, 4012 and 4013. For example, lamp 4011 emits fluid light, lamp 4012 emits green light and lamp 4013 emits red light. For the overlay of the green, blue and red light, an optical mixer is used, also called optical plenum. Such an optical mixer includes, for example, mirrors which are transparent from only one side. For example, light from the lamp 4011 and 4013 is reflected into the exposure light path which extends from the green lamp 4012 to the plane of the copier material. The green light of the lamp 4012 thereby shines through a mirror which is transparent for green and red ligth and which is associated with the lamp 4011 and one mirror which is transparent for green and blue light and associated with the lamp 4013.

As already mentioned above, lamps 4011, 4012, and 4013 can be realized by using colour filters which let only blue, green or red light pass. In this case, three filters are used (a red, a green and a blue), as well as two spectral beam dividers, whereby each lamp emits essentially white light. The light of the lamp 4012 then passes through the green filter and travels thereby through the so called optical plenum 4020 and from there to the copy material 45. The light from the lamp 4013 passes through the red filter and is then downwardly deflected by the beam divider in order to further travel in the direction of the copy material. The light from the blue lamp passes through a blue filter, is then deflected by a blue beam divider and also downwardly directed.

Furthermore, schematically provided is a light-mixing system 4100 to render homogenous and widen the light, as well as the LCD matrix 20, the film 200, the projection lense 30 and the copy material 45.

An advantage of the arrangement with differently coloured lamps shown in FIG. 13 resides in that the spectrum of the exposure light can be changed in a controlled manner in that the intensity of the light emission of one or more lamps, for example, by way of diaphragm, gray filter or control of the lamp is changed, wherein that, for example, by way of shutters or by the control of the lamps, the length of time is changed while light of one specific colour acts on the copier material. It is also possible to dispense with a balance filter. However, these optical elements or other optical elements as shown in FIGS. 2 and 3 can also be used.

What is claimed is:

1. Photographic copier apparatus for projecting a photographic original onto a light sensitive copy material, comprising:

a light means for emitting light for the projection, a number of optical, light guiding means for guiding the light along a light path from the light means to the copy material as well as for the projecting of the original onto the light sensitive copy material, and a liquid crystal matrix through which the light is guided by way of the light guiding means, before it exposes the copy material, whereby the liquid crystal matrix includes a plurality of elements, the transmission of which can be individually changed, the change in transmission of each element of the liquid crystal matrix being achieved by scattering of the light passing through the element, whereby the degree of the scattering is controllable by application of a voltage, wherein the liquid crystal matrix comprises:
   (a) a first transparent plate and a second transparent plate which are planar and positioned spaced apart parallel;
   (b) a liquid crystal fluid which is enclosed between the plates;
   (c) a plurality of picture elements (pixels);
   (d) first electrodes and second electrodes provided on the first and second plates, respectively, and associated with the picture elements;
   (e) feed conductors for feeding control signals to the first and second electrodes;
   (f) the first electrodes being located on one side of the first transparent plate;
   (g) the feed conductors associated with the first electrodes being located on the other side of the first transparent plate; and
   (h) the respective feed conductors being connected with the first electrodes on the other side of the first transparent plate through conductive regions in the first plate, said conductive regions connecting the first electrodes to the feed conductors through the first transparent plate.

2. Photographic copier apparatus according to claim 1, wherein the maximum transmission of the liquid crystal matrix is higher than 10%.

3. Photographic copier apparatus according to claim 1, wherein the ratio of maximum to minimum transmission of the liquid crystal matrix is less than 5.

4. Photographic copier apparatus according to claim 1, wherein the light shone through liquid crystal matrix is projected optically unfocused onto the light sensitive copy material so that a light intensity profile produced by said plurality of elements is smoothed.

5. Photographic copier apparatus according to claim 1, wherein a diffusion disc is positioned in the immediate vicinity of the liquid crystal matrix between the liquid crystal matrix and the photographic original, to homogenize the intensity profile generated by the liquid crystal matrix before the light reaches the photographic original.

6. Photographic copier apparatus according to claim 1, wherein the liquid crystal matrix is positioned in a light duct and/or is embedded in a diaphragm arrangement which intercepts scattered light from the liquid crystal matrix before it reaches the copy material.

7. Photographic copier apparatus according to claim 6, wherein a diffusion disc is positioned in the immediate vicinity of the liquid crystal matrix between the liquid crystal matrix and the photographic original, to homogenize the intensity profile generated by the liquid crystal matrix before the light reaches the photographic original and the light duct is closed by the diffusion disc.

8. Photographic copier apparatus according to claim 1, wherein a gray filter and/or several colour filters are insertable into the light path.

9. Photographic copier apparatus according to claim 1, wherein a comb filter is provided in the light path which lets light within a plurality of preselected spectral windows pass at a respectively preselected intensity.

10. Photographic copier apparatus according to claim 1, wherein a balance filter is provided in the light path which changes the spectral intensity distribution of the light.

11. Photographic copier according to claim 1, wherein the conductive regions are openings in the first plate, the edges or walls of the openings being at least partly covered with a conductive material.

12. Photographic copier according to claim 1, wherein at least one of the first electrode or second electrode are made of a material which at least in the visible light spectrum is transparent.

13. Photographic copier according to claim 1, wherein at least some of the feed conductors which are associated with the first electrodes are made of a material which at least in the visible light spectrum is transparent.

14. Photographic copier according to claim 13, wherein the transparent material of the feed conductor is also conductive.

15. Photographic copier according to claim 14, wherein the transparent material is indium oxide.

16. Photographic copier according to claim 1, wherein the first plate includes a radiation sensitive additive.

17. Photographic copier according to claim 16, wherein the additive is a silver containing additive.

18. Photographic copier according to claim 16, wherein selected regions of the first plate have been irradiated and subjected to a material removing operation to produce the openings.

19. Photographic copier according to claim 18, wherein the regions are subjected to additional etching.

20. Photographic copier according to claim 1, wherein the conductive regions in the first transparent plate have been provided by doping.

21. Photographic copier according to claim 1, wherein the conductive regions are formed by filing openings in the first transparent plate with a transparent film material selected from the group of synthetic resin, mastic and putty.

22. Photographic copier according to claim 1, wherein UV-protection is applied to at least one of the first and second transparent plates, said UV protection reflecting or absorbing UV light.

23. Photographic copier according to claim 1, wherein each second electrode is respectively associated with two first electrodes of two picture elements of the liquid crystal matrix.

24. Photographic copier according to claim 1, wherein the picture element is exposed to one of analogue and binary AC-signals.

25. Photographic copier according to claim 1, further including a colour selective filter arrangement for separately selectively exposing a copy material for each of the colour ranges for which the copy material has a sensitivity.

26. Photographic copier apparatus according to claim 1, wherein the apparatus is combined with an external scanner which scans the original for the production of index prints, whereby the scanning data are used for controlling the liquid crystal matrix.

* * * * *